United States Patent [19]

Saima et al.

[11] 4,288,290

[45] Sep. 8, 1981

[54] APPARATUS FOR EXCHANGING CONTROL ROD DRIVE MECHANISM IN A NUCLEAR REACTOR

[75] Inventors: Tooru Saima, Tokyo; Isao Ohya, Yokohama; Takahiko Imada, Akishima; Hideo Sato, Hachioji; Shinichi Katsuma, Yokohama, all of Japan

[73] Assignee: Tokyo Shibaura Denki Kabushiki Kaisha, Kanagawa, Japan

[21] Appl. No.: 3,523

[22] Filed: Jan. 15, 1979

[30] Foreign Application Priority Data

Jan. 19, 1978 [JP] Japan ................................. 53/4717

[51] Int. Cl.³ ...................... G21C 17/00; G21C 19/20
[52] U.S. Cl. ................................ 176/19 R; 176/36 R
[58] Field of Search ..................... 176/19, 30, 78, 36 R

[56] References Cited
U.S. PATENT DOCUMENTS

| 3,955,692 | 5/1976 | Cody et al. | 176/30 |
| 4,158,600 | 6/1979 | Akimoto et al. | 176/30 |
| 4,175,000 | 10/1979 | Jabsen | 176/78 |

Primary Examiner—S. A. Cangialosi

Attorney, Agent, or Firm—Stevens, Davis, Miller & Mosher

[57] ABSTRACT

In apparatus for exchanging a control rod drive mechanism of a nuclear reactor of the type comprising a horizontal platform supported to be rotatable in a working chamber disposed below a reactor pressure vessel and a traveling carriage traveling on a rail assembly laid on the platform, there is provided a beam attached to the traveling carriage to be swingable between the vertical and horizontal positions and provided with a carrier for vertically moving the control rod drive mechanism. A holding device is secured to the beam so as to hold the control rod drive mechanism when the beam is moved to the horizontal position. The bolts which are used to connect the control rod drive mechanism to a housing in the pressure vessel are loosened and clamped by a bolt mounting device, which is conveyed in and out of the passage of movement of the carrier. There is further provided a carriage for receiving the control rod drive mechanism when the beam is moved to the horizontal position and for conveying the mechanism into an inspection chamber for inspecting the control rod drive mechanism.

16 Claims, 47 Drawing Figures

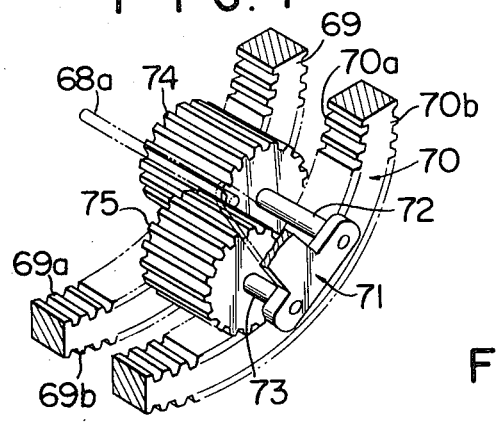
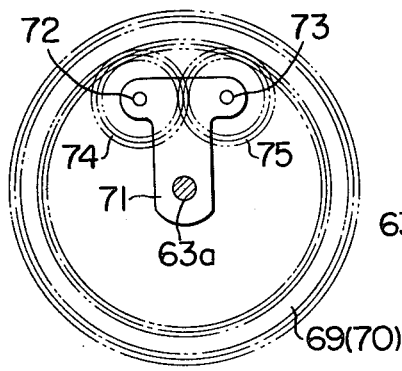
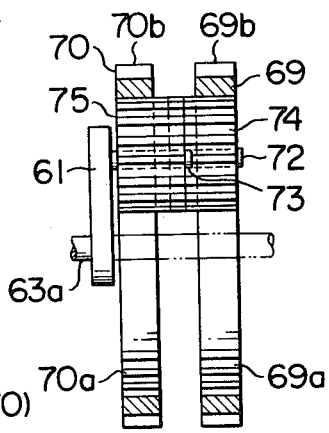
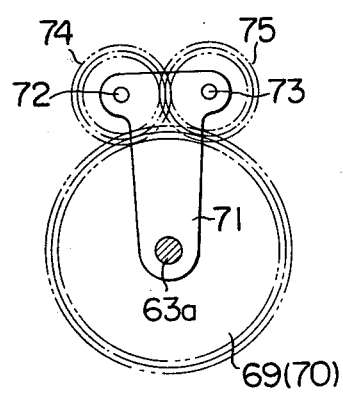
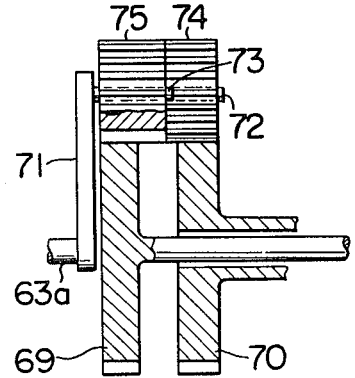

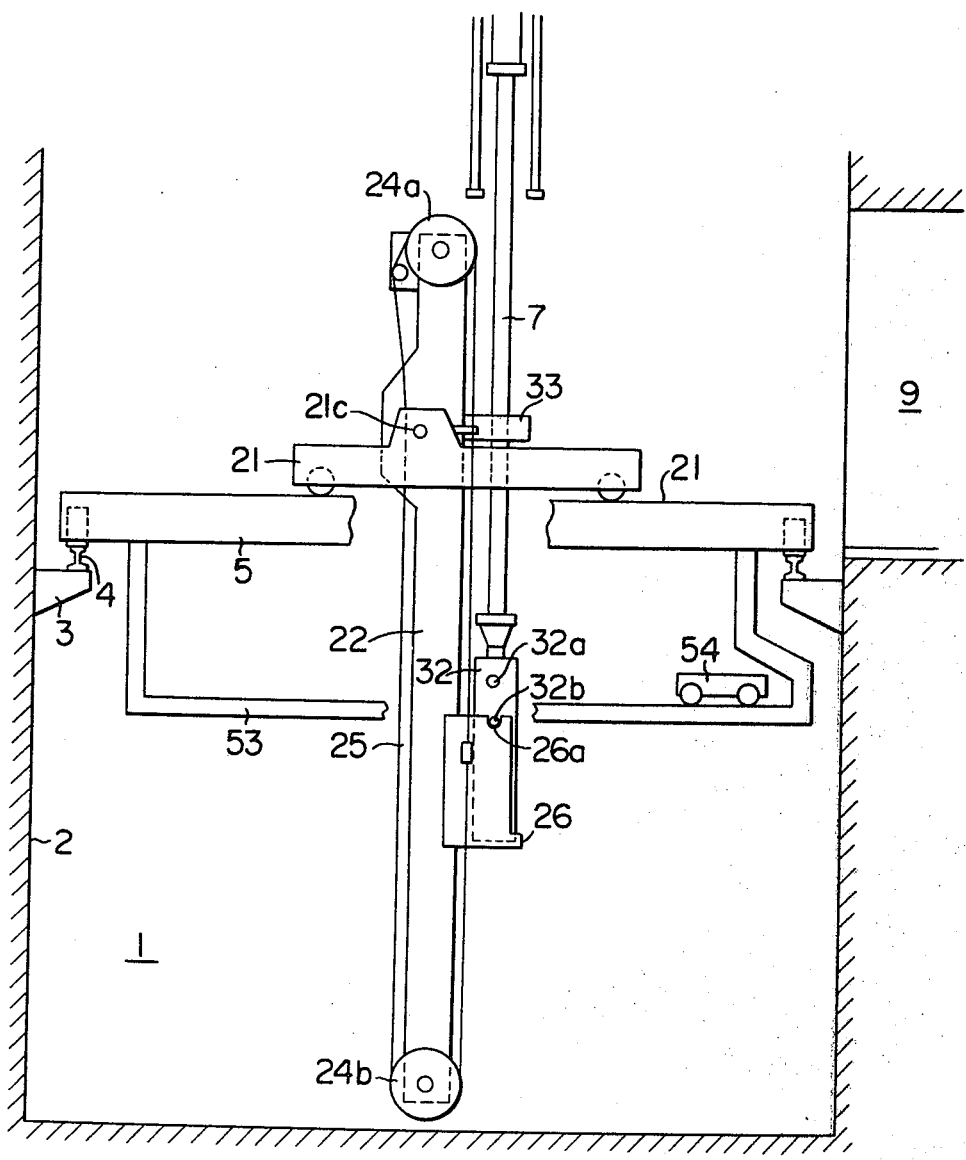
F I G. 14

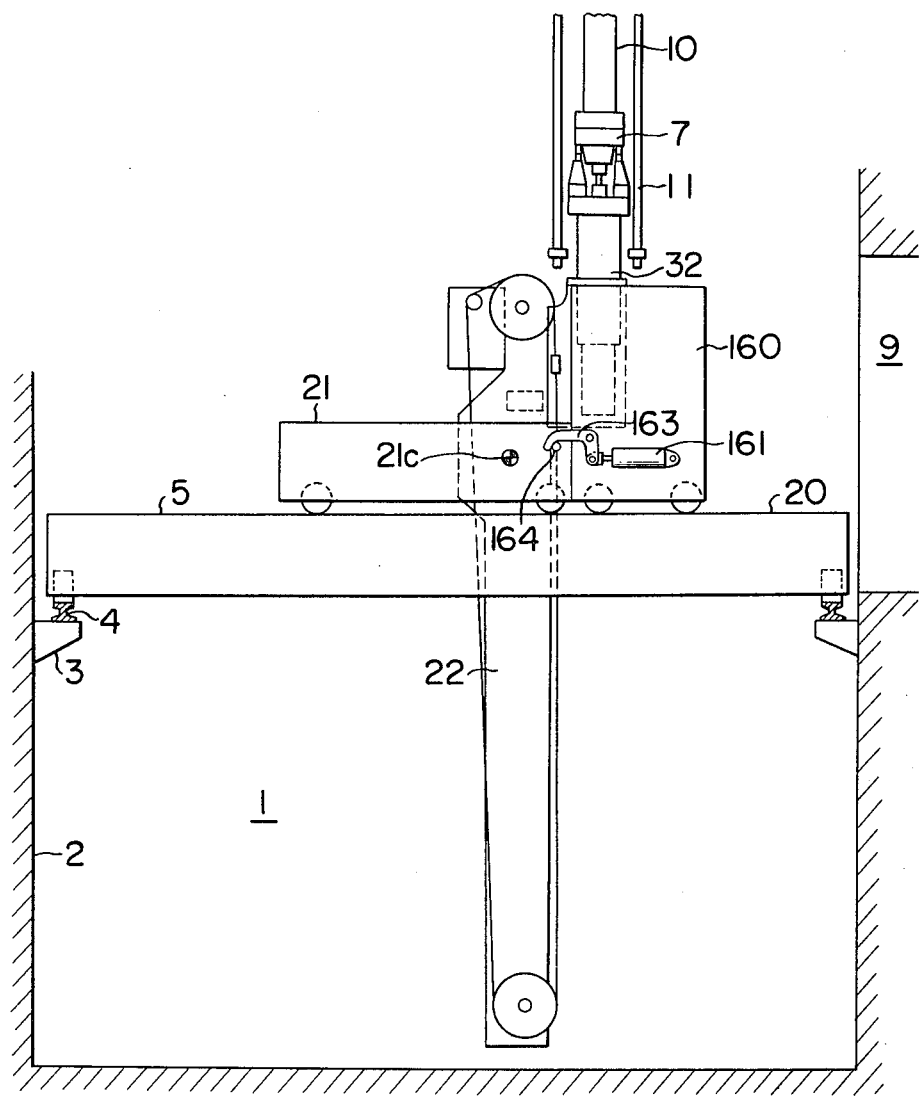
F I G. 38

F I G. 45
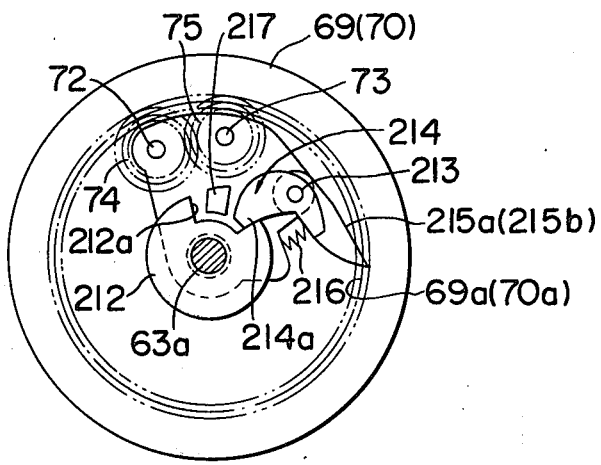
F I G. 46
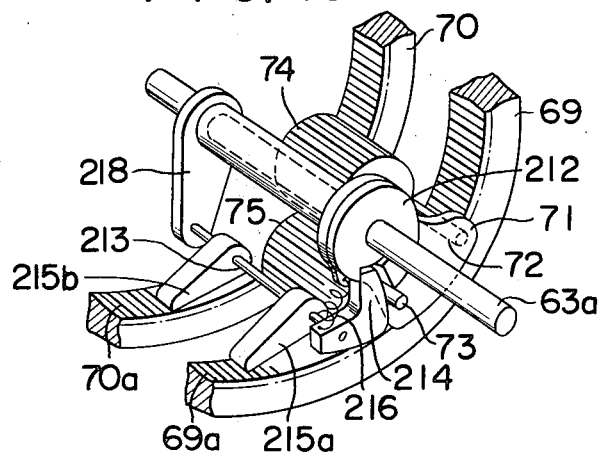

APPARATUS FOR EXCHANGING CONTROL ROD DRIVE MECHANISM IN A NUCLEAR REACTOR

BACKGROUND OF THE INVENTION

This invention relates to apparatus for exchanging a control rod device mechanism in a nuclear reactor for effecting maintenance or inspection thereof in a nuclear power plant.

Generally, in a boiling water reactor, the control rod drive mechanisms is arranged below the pressure vessel and connected to the bottom thereof through a housing in the boiling water reactor core. Although the control rod drive mechanism is detached from the reactor afrer an operation over a predetermined time interval for periodical inspection in an inspection chamber disposed at an independent place near the reactor, this detaching work requires many workers and involves problems regarding safety work and exposure to radiations for the workers.

FIG. 1 is a schematic elevational view showing conventional apparatus for exchanging the control rod drive mechanisms, in which a cylindrical working chamber 1 for exchanging the control rod drive mechanism is provided below the nuclear reactor and surrounded by a wall 2 generally made of concrete. Supporting members 3 are mounted on the inside peripheral surface of the wall 2 and an annular rail is mounted on the supporting members 3. A platform 5 on which a winch is mounted on the rail 4 to be movable freely and rotatable therealong. The winch is constructed so that a carriage 8 for conveying a control rod drive mechanism 7 is guided and accommodated into the inside hollow portion of the platform 5 from a passage 9 formed through the peripheral wall 2. For this reason, it is required that the bottom surface of the passage 9 should be substantially flat with respect to the bottom surface of the platform 5.

The control rod drive mechanism 7 conveyed into the working chamber 1 is attached by bolts to a housing 10 of the control rod drive mechanism 7 in the reactor pressure vessel, and stud bolts 11 are suspended around this mechanism 7 and the housing 10. Although a plurality of control rod drive mechanisms 7 and stud bolts 11 are actually arranged side by side in the reactor, a minimum number thereof necessary to understand illustrated in FIG. 1.

In the arrangement described above, the control rod drive mechanism 7 is detached in the following manner. At first, only two bolts among a plurality of bolts connecting the control rod drive mechanism 7 to the housing 10 are manually removed. A pin carrying a pulley 12 is fitted into one bolt hole, and into the other bolt hole is fitted a pin attached to the front end of the wire rope 14 wound on a drum 13 of the winch 6. The wire rope 14 passes about pulleys 12 and 16, and a locating member 17 is provided with the pulleys at its lower end and with a projecting member 15 which projects upwardly and is adapted to engage the lower end of the control rod drive mechanism 7 to vertically hold the locating member 17. In this condition, the other bolts fixing the control rod drive mechanism 7 to the housing 10 are all removed and the wire rope 14 on the drum 13 is unwound from the winch 6, thus lowering the locating member 7 and the control rod drive mechanism 7 held thereon. The workers hold the control rod drive mechanism 7 to rotate it by 90° from the position shown in FIG. 1 while it is being lowered and then mount it on the carriage which is then transferred into the inspection chamber through the passage 9.

The attachment of the control fod drive mechanism 7 to the housing 10 is carried out in the reverse order to that described above.

However, the attachment and/or detachment of the control rod drive mechanism 7 are performed directly by workers in the working chamber 1 below the reactor pressure vessel under the condition in which the workers may be exposed to relatively high radiations. Therefore, not only it was dangerous for the workers working in the working chamber, but also many workers are required to exchange the control rod drive mechanisms 7.

SUMMARY OF THE INVENTION

Accordingly, a principal object of this invention is to provide improved apparatus for exchanging control rod drive mechanism capable of assuring safety work for workers in a working chamber below a reactor pressure vessel and decreasing the amount of job of the workers in the chamber.

Another object of this invention is to provide an improved bolt mounting device for loosening and clamping bolts connecting the control rod drive mechanism to the housing member in a reactor pressure vessel.

According to this invention there is provided apparatus for exchanging control rod drive mechanism in a nuclear reactor of the type comprising a horizontal platform supported to be rotatable in a working chamber disposed below a reactor pressure vessel and a traveling carriage traveling on a rail assembly laid on the platform, the apparatus being characterized in that there are provided a beam attached to the traveling carriage to be swingable between the vertical and horizontal portions and provided with a carrier for vertically moving the control rod drive mechanism; holding means secured to the beam for holding the control rod drive mechanism when the beam is moved to the horizontal position; bolt mounting means for loosening and clamping bolts which are used to connect the control rod drive mechanism to a housing in the reactor pressure vessel, conveying means for conveying the bolt mounting means in and out of the passage of movement of the carrier; and further conveying means for receiving said control rod drive mechanism when the beam has been moved to the horizontal position and for conveying the control rod drive mechanism into an inspection chamber for inspecting the control rod drive mechanism through a passage provided for the peripheral wall of the working chamber.

BRIEF DESCRIPTION OF THE DRAWINGS

These and other objects of this invention will become more apparent from the following detailed description taken in conjunction with the accompanying drawings, in the same reference numerals are applied to designate the same or like parts in various views, in which;

FIG. 7 is a perspective view showing a portion of the multi-shaft automatic bolt clamping assembly shown in FIG. 6;

FIG. 8 is a plan view of the assembly shown in FIG. 7;

FIG. 9 is a cross-sectional view of the assembly shown in FIG. 8;

FIG. 12 shows a modification of the multi-shaft automatic bolt clamping assembly shown in FIG. 7;

FIG. 13 shows a longitudinal sectional view of the assembly shown in FIG. 12.

FIG. 14 through FIG. 16 are elevational views for explaining the operation of the apparatus according to this invention;

FIG. 25 through FIG. 40 show modifications of various parts of the apparatus according to this invention;

FIG. 45 is a plan view showing a differential gearing of the multi-shaft automatic bolt clamping assembly incorporated with a bolt loosening device;

FIG. 46 shows an enlarged perspective view of a part of the assembly shown in FIG. 45.

DESCRIPTION OF THE PREFERRED EMBODIMENT

Figure 1:
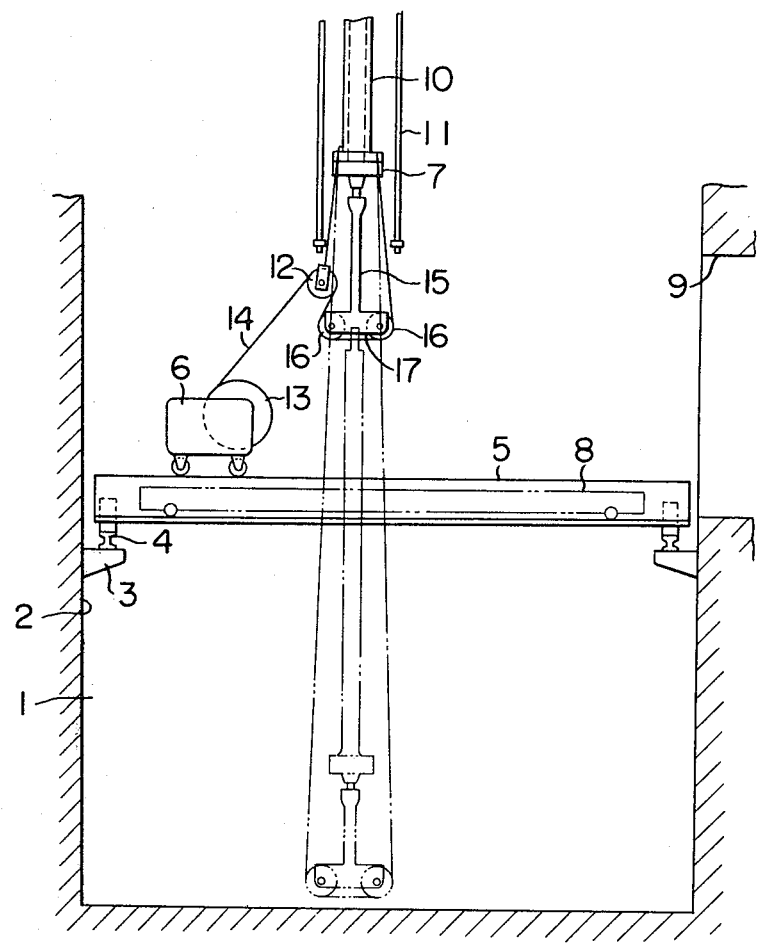
FIG. 1 is a schematic elevational view showing a manner of exchanging control rod drive mechanism in a nuclear reactor, according to prior art.
Figure 2:
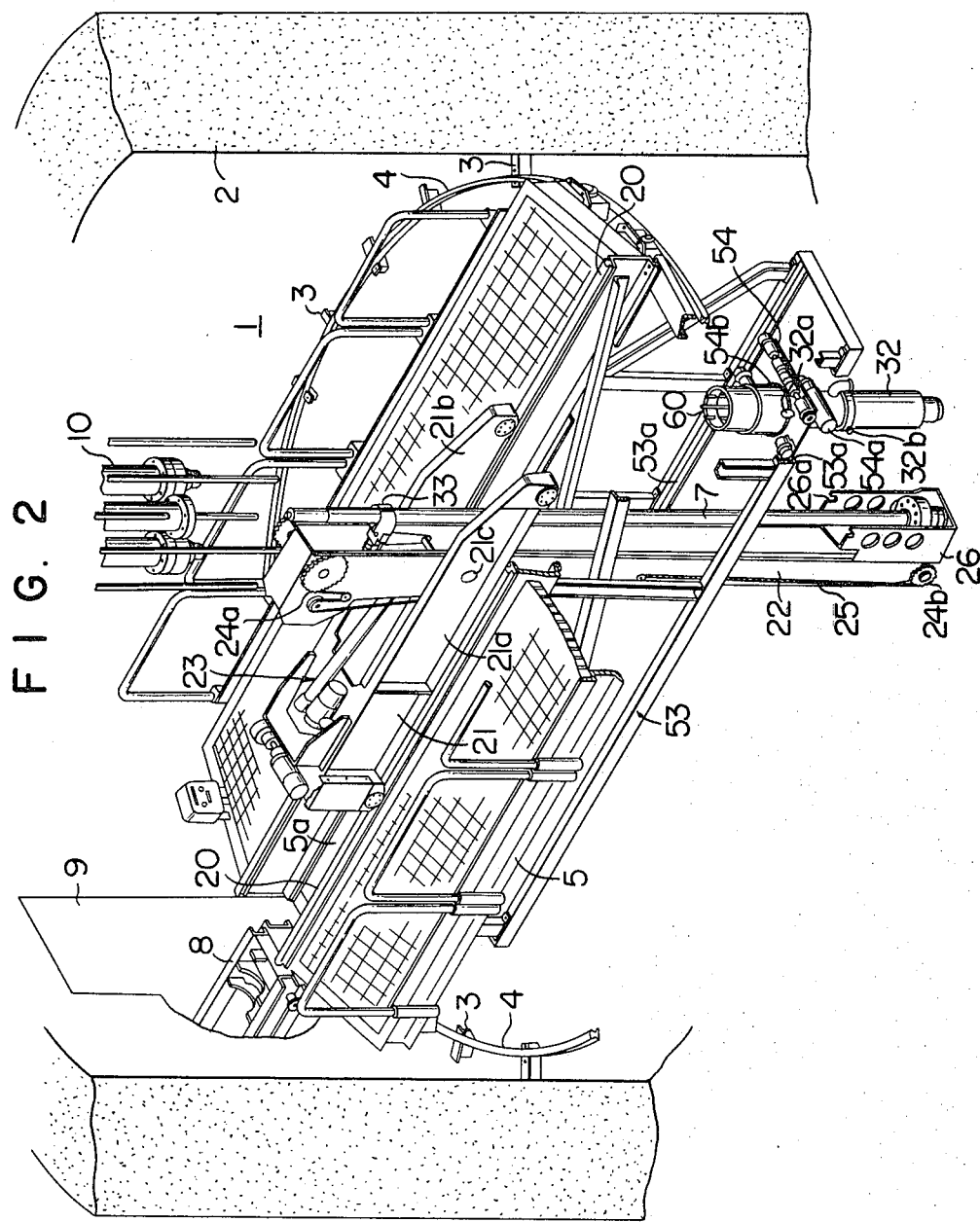
FIG. 2 is a perspective view showing apparatus for exchanging the control rod drive mechanism, partially broken away, according to this invention.

Referring to FIG. 2, a platform 5 is rotatably mounted on an annular rail 4 supported by supporting members 3 projecting from the inner peripheral wall of a cylindrical working chamber 1 located below the reactor pressure vessel. The platform 5 is provided with a longitudinal cavity 5a in its central portion and rails 20 on which a traveling carriage 21 is mounted are laid along both sides of the cavity 5a. The cavity 5a has a volume sufficient to accommodate a carriage 8 for conveying a control rod drive mechanism 7 into and away from the cavity 5a.

The travelling carriage 21 has a U-shaped cross-section to ride on the both rails 20 and the forward top wall of the carriage is broken away in FIG. 2. A beam 22 is pivotably supported by a pin 21c between the side walls 21a and 21b of the forward portion of the carriage 21 to be tilted about the pin 21c between the vertical and horizontal positions by a drive mechanism 23 mounted on the carriage 21. FIG. 2 shows the vertical position of the beam 22, in which the upper end of the beam 22 projects beyond the upper surface of the traveling carriage 21 and the lower end thereof projects downwardly through the cavity 5a of the platform 5. When the beam 22 is tilted to the horizontal position, it is housed in the traveling carriage 21. Sprockets 24a and 25a are attached to both sides of the longitudinal ends of the beam 22 between which chains 25 are streached, respectively, and a carrier 26 is located to engage the chains 25 and to be movable along the beam 22.

Figure 3:
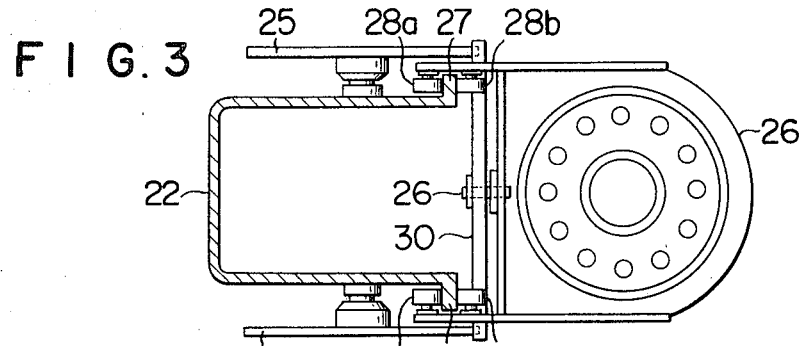
FIG. 3 shows a plan view of a carrier attached to a beam in the apparatus shown in FIG. 2.

As shown in FIG. 3, the U-shaped beam 22 is provided with flanges 27 at the edges of both side walls and a pair of rollers 28a and rollers 29a are disposed at rear end sides of the carrier 26, respectively, so as to clamp the flanges 27. An arm 30 is connected at its both ends to the chains 25 streched along the both sides of the beam 22, and the arm 30 is pivotally supported by a pin 29 at the center portion of the rear end of the carrier 26.

When the chains 25 are driven, the rollers 28a and 28b roll along the both sides of the flanges 27 thereby vertically moving the carrier 26 along the beam 22. At this time, even if the chains on both sides are driven at different speeds, since the arm is pivotably supported by the pin 29, the carrier 26 can be moved in an inclined state.

The carrier 26 not only directly supports the control rod drive mechanism 7 to be removed but also holds a device for loosening and clamping bolts which connect the control rod drive mechanism 7 to the housing 10. This device 32 is called "a bolt mounting device 32" hereinafter.

Figure 4:
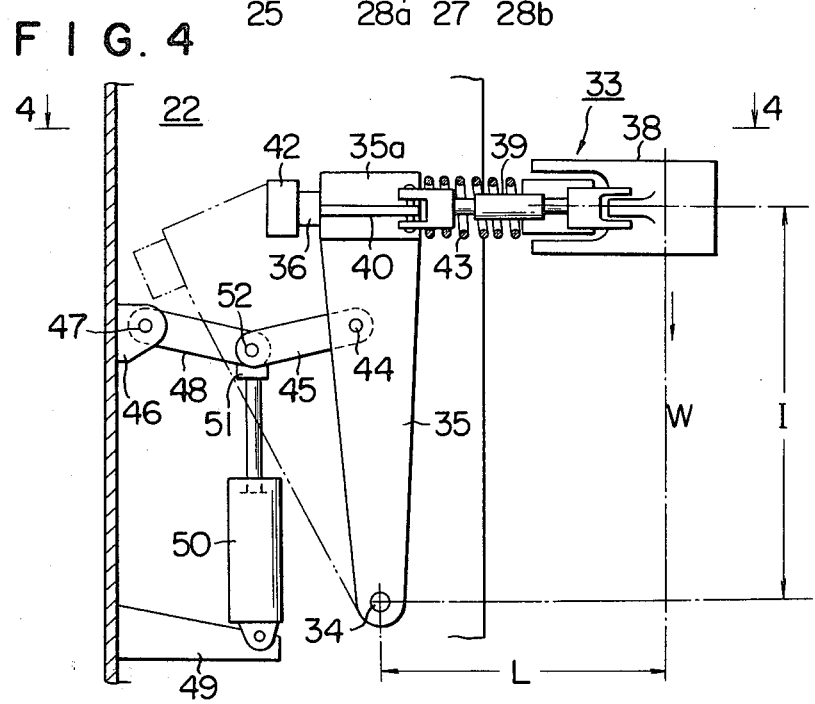
FIG. 4 shows a side view of a holding arm attached to the beam.
Figure 5:
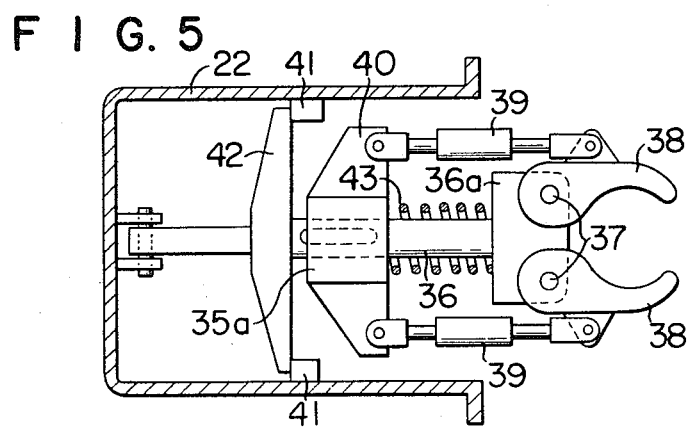
FIG. 5 shows a plan view of the holding arm shown in FIG. 4.

The beam 22 is further provided with a holding arm 33 at a position suitable for being housing in the interior of the U-shaped beam 22 so as not to disturb the movement of the carrier 26 and for supporting the control rod drive mechanism 7 as occasion demands by being projected from the interior of the beam 22. More particularly, as shown in FIGS. 4 and 5, to cooperate with this holding arm 33, a rocking lever 35 pivotable about a pin 32 extending in a direction normal to the axis of the beam 22 is mounted within the beam 22 and an operation bar 36 extending in a direction normal to the axis of the rocking lever 35 is attached to a boss 35a provided at the front end of the lever 35 to be slidable only in the axial direction. A pair of jaws 38 are pivotably secured to the front end of the bar 36 by means of pins 37 extending substantially parallel with the axis of the beam 22. The jaws 38 are connected through link members 39 to wings 40 at both sides of the boss 35a, respectively, whereby the jaws 38 are opened or closed by the movement of the boss 35a to hold firmly or release the control rod drive mechanism 7.

The forward (leftward in FIG. 5) movement of the operation bar 36 is limited by the engagement of stopping members 41 projecting from the inner surfaces of the side walls of the beam 22 with an abutting member 42 attached to the rear end of the bar 36. A compression spring 43 is disposed between the boss 35a and the jaw attaching member 36a of the operation bar 36 so as to urge the boss 35a to engage front surface of the abutting member 42.

A link member 45 has one end pivotably secured to the rocking lever 35 through a pin 44 and the other link member 48 also has one end pivotably attached through a pin 47 to a bracket 46 which is secured to the beam 22. The inner ends of these link members 45 and 48 are pivotably connected by a pin 52 mounted on the front end of a piston rod 51 of a hydraulic cylinder-piston assembly 50 pivotably supported by a bracket 49 on the side surface of the beam 22. This structure is a so called toggle joint.

FIG. 4 shows the closed state of the jaws 38 and in this stage, the rocking lever 35 is rotated forwardly (rightwardly in FIG. 4) by the cooperation of the hydraulic cylinder-piston assembly 50 and the link members 45 and 48. Concurrently, therewith, the operation bar 36 is also moved rightwardly by the action of the compression spring 43 till the member 42 abuts against the stopping members 41 and then the both jaws 38 are rotated to be closed about the pins 37 through the link members 39, respectively, to hold the control rod drive mechanism 7 therebetween. When the rocking lever 35 is slightly rotated counter-clockwisely from the state shown in FIG. 4, the jaws 38 are slightly opened to release the control rod drive mechanism 7 so as to serve as a guide member therefor. Then, when the rocking lever 35 is further rotated counter-clockwisely, the boss 35a abuts against the abutting member 42 to fully open the jaws 38 and moves leftwardly together with the operation bar 36 to accommodate the jaws 38 into the beam 22.

Referring again to FIG. 2, a rail assembly 53 on which a carriage 54 is traveled to convey the bolt mounting device 32 is suspended from the lower portion of the platform 5 and the rail assembly 53 comprises two rails 53a horizontally arranged on both sides of the beam 22. The carriage 54 can travel on the rails 53a by, for example, a drive mechanism 54a shown in FIG. 2, and the carriage 54 is provided with a recess 54b having an opening facing to the beam 22 to receive the bolt mounting device 32 threin. The bolt mounting device 32 is engaged with and supported vertically by pins 32a provided on the upper surface of the carriage 54 and the device 32 is further provided with pins 32b adapted to engage with notches 26b formed at the upper edges of the side walls of the carrier 26. Therefore, the device for loosening or clamping the bolts which interconnect the control rod drive mechanism 7 and the housing 10 operates not only to loosen or clamp the bolts, but also to receive and treat reactor water which may leak from the housing 10 of the reactor core when the control rod drive mechanism 7 is removed therefrom. The bolt mounting device 32 comprises a cylindrical casing 60 in which there is disposed a drive mechanism for simultaneously driving a plurality of spanners.

With reference to FIG. 6 through FIG. 13, the bolt mounting device 32, particularly the cylindrical casing 60 thereof will be described in detail. A reversible electric motor 61 for driving the spanners is provided with an output shaft 61a on which a torque limit member 62 and a reduction gear 63 are mounted. In the casing is housed a gear box 64, and a differential gearing 65 in the gear box 64 is mounted on the output shaft 63a of the reduction gear 63. Spanners 66a and 66b are attached to the rotary shaft 65a and 65b of the differential gearing 65 which is constructed as shown in detail in FIGS. 6 through 9, in which disc plates 69 and 70 are mounted on the output shaft 63a through bearings 67 and 68, respectively, and internal gears 69a and 70a and external gears 69b and 70b are formed on the disc plates 69 and 70, respectively. An arm 71 is secured to the output shaft 63a and provided with lateral projections to which the base portions of pins 72 and 73 are embedded. Pinions 74 and 75 having different thickness are rotatably mounted about the pins 72 and 73 to mesh with each other. The pinions 74 and 75 also mesh with the internal gears 69a and 70a, respectively, and the external gears 69b and 70b also mesh with gears 76 and 77 mounted on the rotary shafts 65a and 65b, respectively. These gears 76 and 77 are rotated in the same direction.

Figure 10:
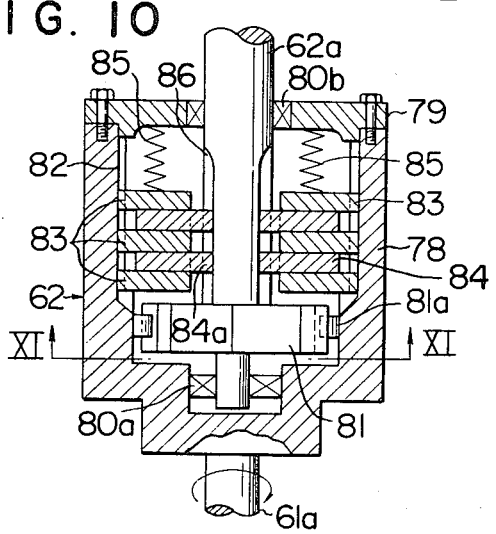
FIG. 10 is a longitudinal sectional view showing a torque limit member.
Figure 11:
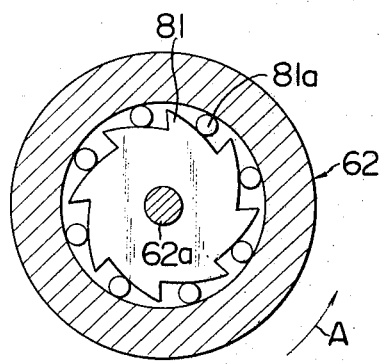
FIG. 11 is a cross-sectional view of the torque limit member taken along the line XI—XI in FIG. 10.

FIGS. 10 and 11 show the detail of the torque limit member 62 which is assembled with a rotating cylindrical member 78 mounted on one end of the output shaft 61a. A cover 79 is secured to one end of the cylindrical member 78 and bearings 80a and 80b are located at the bottom of the cylinder 78 and the cover 79 respectively so as to rotatably support a follow-up shaft 62a. A one-way clutch 81 is secured to the follow-up shaft 62a near the bearing 80a and when the cylindrical member 78 is rotated in a direction shown by an arrow A in FIG. 11, rollers 81a are moved to engage with the one-way clutch 81, thus rotating the follow-up shaft 62a. On the other hand, when the cylindrical member 78 is rotated in the opposite direction, the rollers 81a does not engage the clutch 81, thus not rotating the follow-up shaft 62a. Furthermore, the cylindrical member 78 is provided with a spline groove 82 on its inside peripheral surface. Three circular friction clutch plates 83 provided with splines engage the spline groove 82 and are axially pressed by means of coil springs 85 through friction plates 84 provided with spline grooves 84a respectively. These grooves 84a engage the splines formed on the follow-up shaft 62a to be axially slidable and rotatable with the shaft 62.

Accordingly, the torque limit member 62 operates in a manner that when the cylindrical member 78 is rotated by the rotation of the output shaft 61a, the rotating power is transmitted to the follow-up shaft 62a through the clutch plates 83 and the friction plates 84, but the rotation of the follow-up shaft 62 is stopped when a predetermined load is applied to the shaft, i.e., when the bolts are clamped to its limit state. In this case, the cylinder 78 rotates idly.

Now, when it is intended to clamp two bolts connecting the control rod drive mechanism 7 and the housing 10, the spanners 66a and 66b are previously engaged with the corresponding bolts and when the electric motor 61 is then rotated, the output shaft 63a drives the differential gearing 65 through the torque limit member 62 and the reduction gear 63. Namely, when the shaft 63a is clockwisely rotated, the arm 71 is also rotated so as to counter-clockwisely rotate the pinions 74 and 75 about the pin shafts 72 and 73, respectively. However, these pinions 74 and 75 are meshing with each other and thus, the counterclockwise rotations of the pinions are restrained, so that the internal gears 69a and 70a are clockwisely rotated and the spanners 66a and 66b attached to the rotatary shafts 65a and 65b clamp the bolts. In a case where there exists some difference between the clamping strokes either one of the bolts would be clamped firstly. Assuming now that the spanner 66a firstly clamps the corresponding bolt to the final clamping stroke, the rotation of the gear 76 stops and the internal gear 70a also stops its rotation. Then, the pinion 75 meshing with this internal gear 70a revolves along the inner surface of the gear 70a to drives the pinion 74 engaging the pinion 75, whereby the internal gear 69a meshing with the pinion 74 is rotated at an increased speed and the gear 77 engaging the external gear 69b is rotated thereby rotating the spanner 66b and clamping the other bolt to the final clamping stroke at a high speed. Upon reaching a torque more than a predetermined value, regardless the drive of the motor 61, the torque limit member 62 slips, and the rotation of the internal gear 69a stops, thus completely clamping the bolts.

As a characteristic feature of the differential gearing 65, the driving force is equally applied to the internal gears 69a and 70a, so that if the slip starting torue of the torque limit member 62 were initially regulated to a torque suitable for clamping the bolts, the final clamping torque could be properly adjusted thereby uniformly clamping two bolts, respectively, even if there exists a difference between the clamping strokes of two bolts to be clamped by the spanners 66a and 66b.

Within the casing 60 of the bolt mounting device 32, is set a television camera, not shown, below the spanner drive mechanism and a pair of fiber-scopes operating as optical lens means of the television camera are connected thereto. One of the fiber-scopes is attached to the upper central portion of the bolt mounting device 32 and the other is attached to a predetermined portion on the peripheral surface of a flange to which the bolt is secured.

Although the bolt mounting device 32 supported by the carrier 26 can positioned to a desired position below the control rod drive mechanism 7 by rotating the platform 5, horizontally moving the traveling bogie 21 and raising the carrier 26, when the top end of the bolt mounting device 32 on the carrier 26 approaches the lower end of the control rod drive mechanism 7, this approach is observed through the fiber-scopes by the television camera and projected on the monitor of a remote control operation board. Thus, the position of the bolt mounting device 32 is always remotely observed and precisely and quickly adjusted to the final desired position by controlling the position or angles of the platform 5, the traveling carriage 21 and the bolt mounting device 32.

The actual attachment and removal of the control rod drive mechanism 7 will now be described in detail hereinbelow.

To remove the mechanism 7, the carriage 54 for conveying the bolt mounting device 32 is firstly moved to the passage for elevating the carrier 26. Then the bolt mounting device 32 suspended from the carriage 54 through pin 52a would be positioned above the carrier 26. Then, the chains 25 are driven to upwardly move the carrier 26, and the bolt mounting device 32 is firmly held by the carrier 26 by engaging the projecting pins 32b with the notches 26a of the carrier 26. The carrier 26 is further slightly moved upwardly to slightly separate the pin 32a from the upper surface of the bolt mounting device 32 and the carriage 54 is then retracted to the predetermined position.

After mounting the bolt mounting device 32 on the carrier 26, the platform 5 and the carriage 21 are rotated or moved so that this device 32 will be positioned below the control rod drive mechanism 7 to be removed. The chains 25 are then driven further to raise the carrier 26 to urge the bolt mounting device 32 against the control rod drive mechanism 7 attached to the bottom of the reactor pressure vessel and the bolts which secure this mechanism 7 to the housing 10 are loosened and pulled out by the bolt mounting device 32, while the control rod drive mechanism 7 is being supported by the carrier 26.

Figure 15:
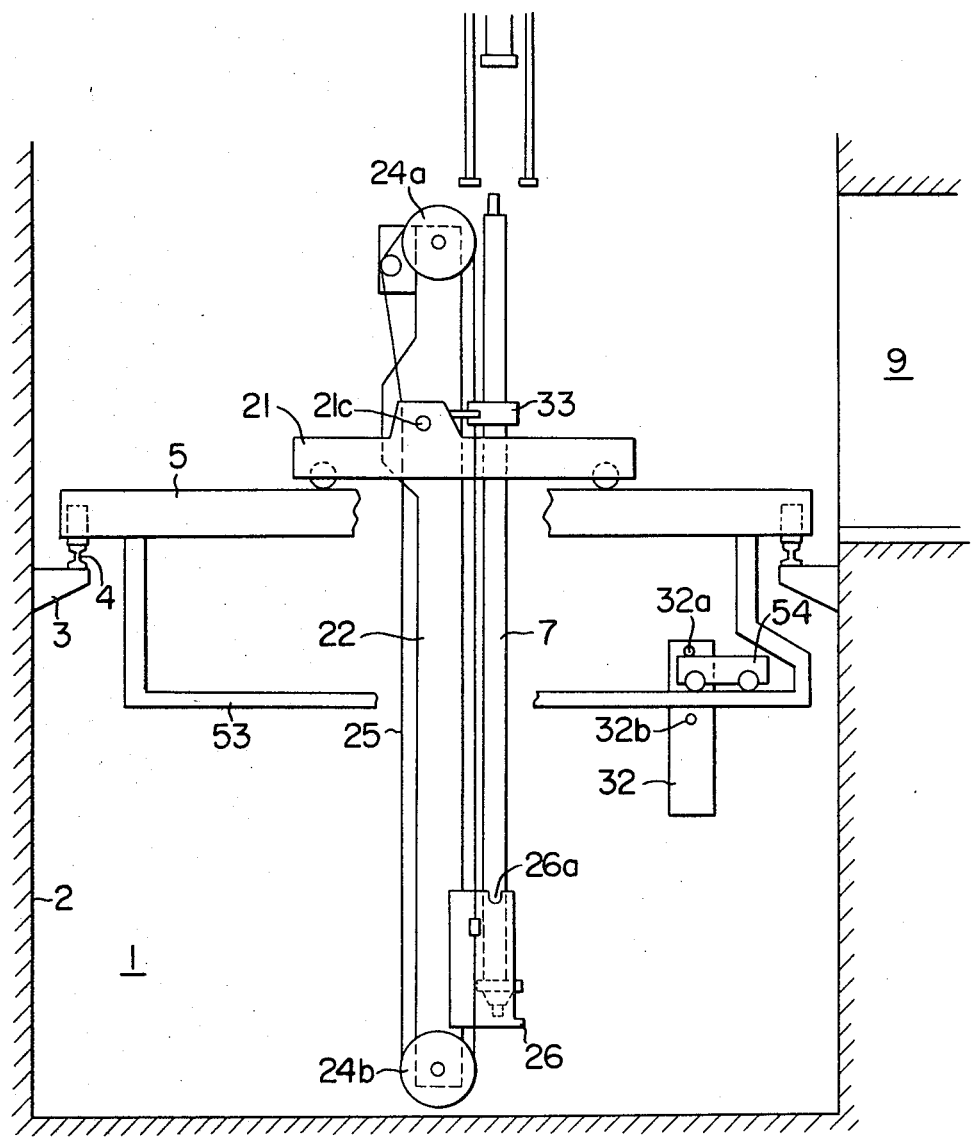

The carrier, on which the control rod drive mechanism 7 has been supported, is then lowered, and before the upper end of the control rod drive mechanism 7 is completely drawn out from the housing 10, when a portion of this mechanism 7 passes through the position of the holding arm 33 provided with a pair of the holding jaws 38, the arm projects and loosely holds the mechanism 7 to support and guide the same. When the control rod drive mechanism 7 is further drawn out by a predetermined amount, the carrier 26 once stops its movement and the holding arm 33 holds tightly the control rod drive mechanism 7, and thus, the control rod drive mechanism 7 is completely drawn out by again lowering the carrier 26 as shown in FIG. 15.

Figure 16:
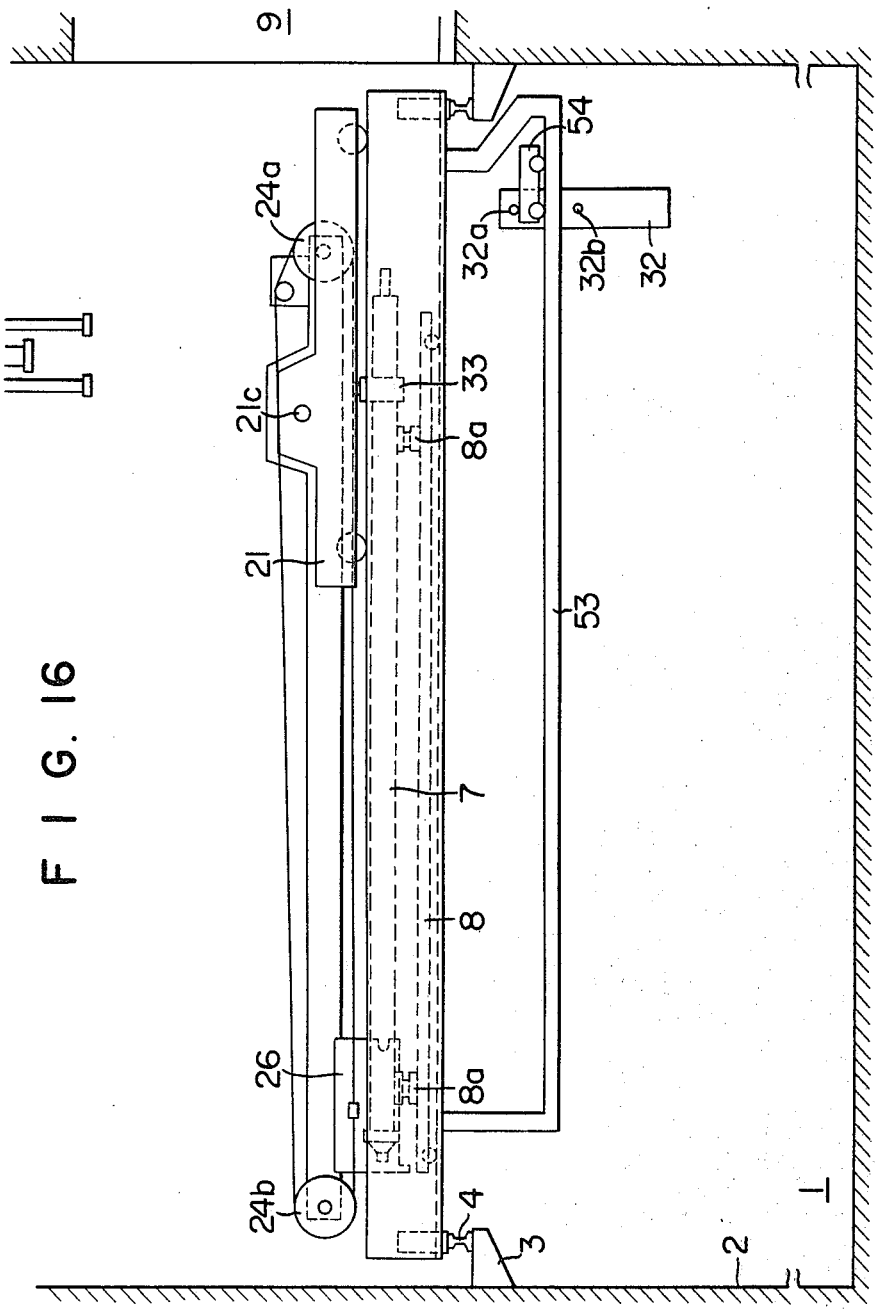

When the carrier 26 is lowered, the arm 33 again holds tightly the control rod drive mechanism 7, which is then rotated to the horizontal position together with the beam 22, and the conveying carriage 8 is moved to a position below the tilted beam 22 to transfer the control rod drive mechanism 7 along the conveying carriage 8 as shown in FIG. 16. Thereafter, the conveying carriage 8 is moved out through the passage 9 towards the inspection chamber.

It will be understood that the control rod drive mechanism 7 can be attached to the bottom of the reactor pressure vessel by the reverse operation opposite to that described above in connection with the removal thereof.

Figure 17:
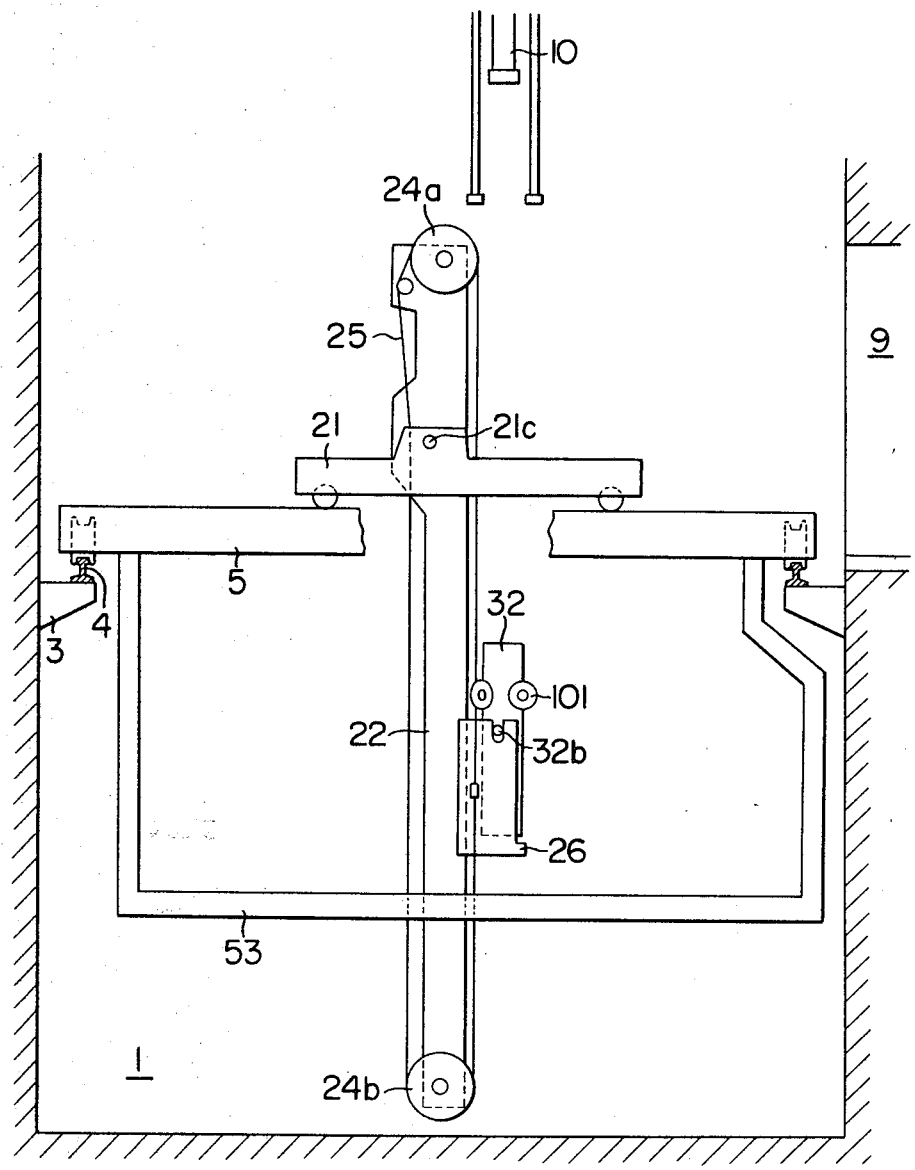
FIG. 17 and FIG. 18 show side and front views of another embodiment of apparatus for exchanging control rod drive mechanism according to this invention.
Figure 18:
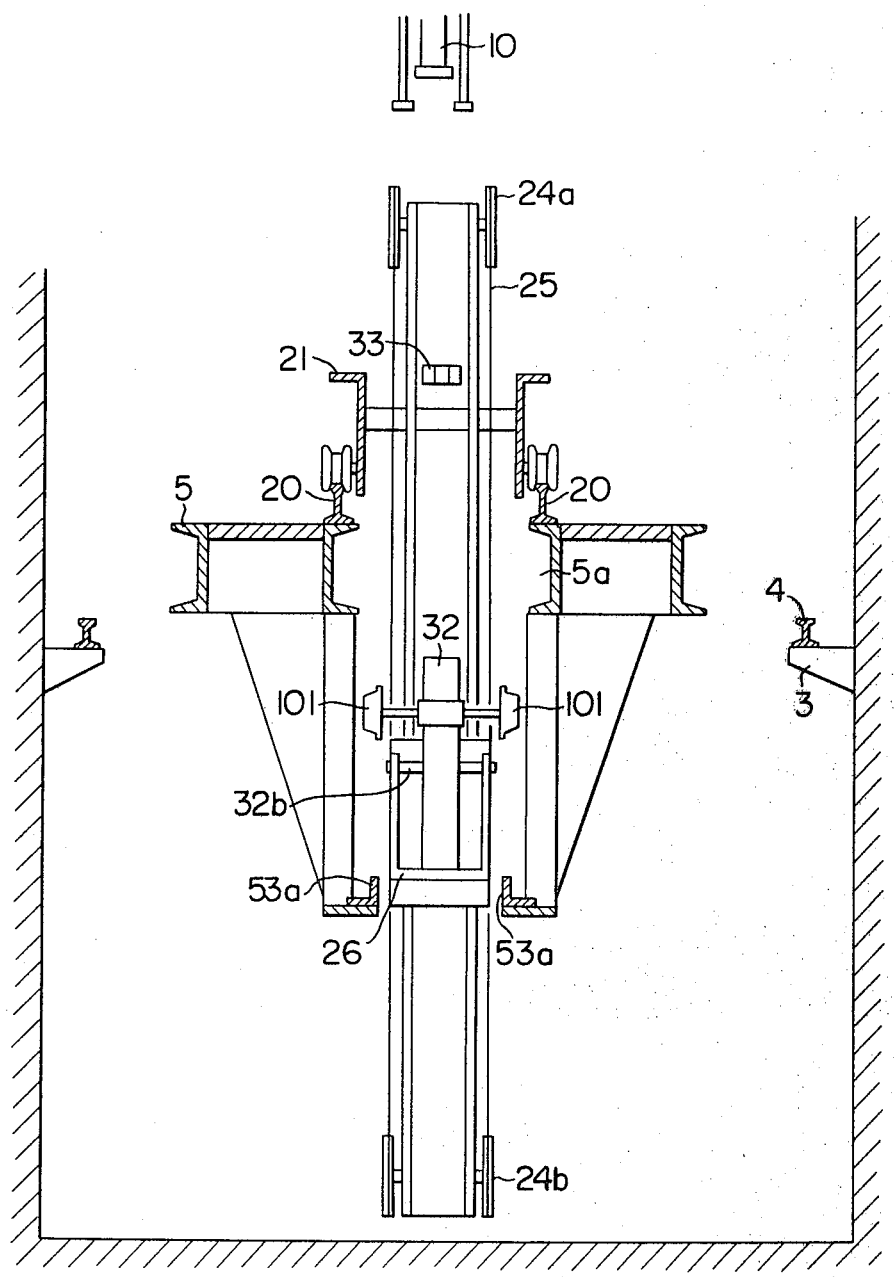

FIGS. 17 and 18 show another (second) embodiment of apparatus for exchanging the control rod drive mechanism according to this invention, in which the carrier 54 for conveying the bolt mounting device 32 is not used and wheels 101 for conveying this device 32 is disposed on both sides of the upper portion of the device 32 so that the wheels 101 will travel on the rails 53a suspended below the platform 5. In this embodiment, the distance between these rails 53a is determined so that the beam 22, the chains 25 and the carrier 26 can freely move between the rails 53a and the distance between the wheels 101 is also determined to be smaller than the width of the central hollow portion of the platform 5, the distance between the rails 20 and the distance between the both side walls of the traveling carriage 21 are also determined such that the wheels 101 can freely travel between these distances.

Although, in this second embodiment, the removal of the control rod drive mechanism 7 can be effected in substantially the same manner as that described in conjunction with the former (first) embodiment, when the carrier 26 is lowered after the arm 33 holds the mechanism 7, the wheels 101 are moved to rest on the rails 53a in response to the lowering of the carrier 26. The bolt mounting device 32 then separates from the carrier 26 and moves along the rails 53a. After this device 32 has been retracted to the predetermined position by suitable drive means, not shown, the carrier 26 is again raised to directly support the control rod drive mechanism 7 and jaws 38 are slightly opened to loosen the control rod drive mechanism 7, whereby it is lowered to the lower-limit position as the carrier 26 lowers. The lowered control rod drive mechanism 7 is then conveyed into the inspection chamber in the same manner as that described in connection with the first embodiment.

Figure 19:
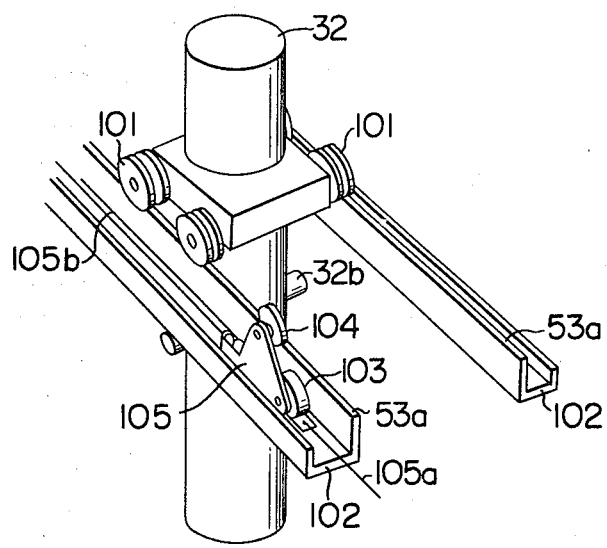
FIG. 19 is a perspective view showing the bolt mounting device utilized in the apparatus shown in FIG. 17.

Further, it will be understood that when the bolt mounting device 32 is supported on the carrier 26, the bolt mounting device 32 carried on the rails 53a is firstly moved by the wheels 101 directly above the carrier 26 and then the carrier 26 is upwardly moved to support the bolt mounting device 32. The movement of the bolt mounting device 32 along the rails 53a may be performed by suitable drive means such as a compact electric motor which can be remotely controlled in a control room. However, in a case where it is impossible to assemble such compact motor into the bolt mounting device 32, the movement thereof may be performed, for example, by a mechanism shown in FIG. 19. Referring to FIG. 19, auxiliary guide members 102 are provided on the outer sides of the rails 53a, respectively, to carry a traveling carriage 105 having wheels 103 and pushing wheels 104 adapted to contact the wheels 101 for conveying the bolt mounting device 32. The carriage 105 is moved by means of chains 105a and 105b connected to the front and rear ends of the carriage 54a. Thus, the bolt mounting device 32 can be moved by driving the wheels 101 by the pushing wheels 104. In this connection, if two pushing carriages 105 were mounted on the both rails 53a, respectively, the bolt mounting device 32 could be precisely moved forwardly or backwardly by selectively driving one of these carriage 105. Further, the pushing carriage 105 may be moved by means of a screw threaded shaft, now shown, in place of the chains 105a and 105b.

Figure 20:
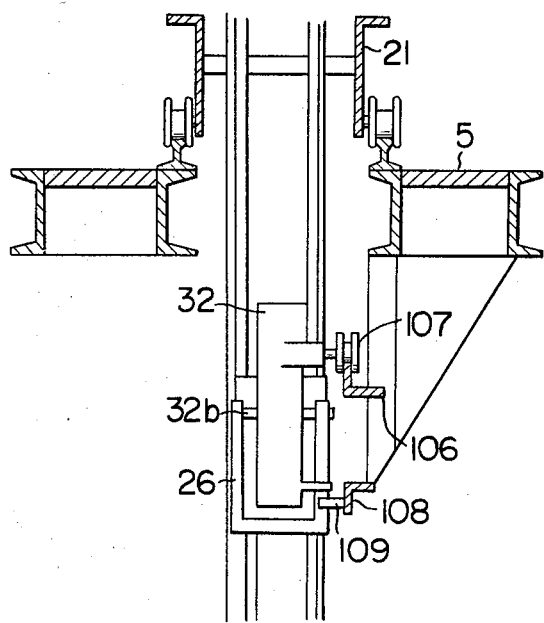
FIG. 20 and FIG. 21 show front and perspective views of still another embodiment of the apparatus according to this invention.

Although, in FIG. 19, the conveying wheels 101 are mounted on the rails 53a laid on both sides of the bolt mounting device 32, it is also possible to mount only one wheel as shown in FIG. 20 in which case a conveying wheel 107 provided with flange engaging the guide surfaces of a rail 106 is located on one side of the bolt mounting device 32 and a horizontal wheel 109 contacting a guide rail 108 is disposed below the wheel 107 so as to prevent the inclination thereof.

Figure 21:
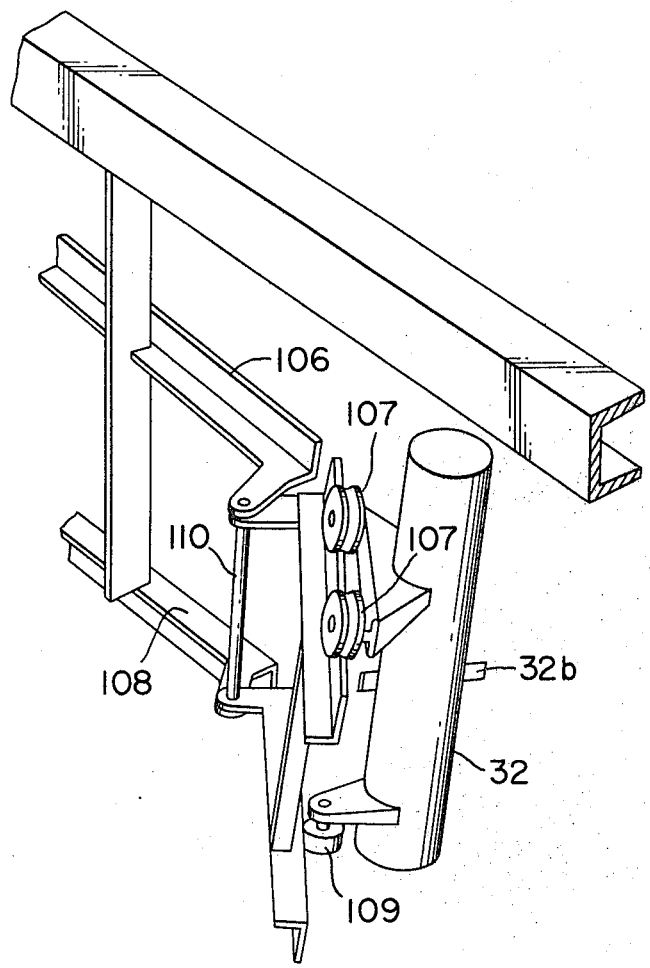

FIG. 21 shows another example of the bolt mounting device 32 provided with only one wheel 107 shown in FIG. 20, in which certain portions at one ends of the rails 106 and 108 are constructed to be outwardly swingable about a vertical shaft 110, respectively. In this construction, the removal of the control rod drive mechanism 7 is carried out near the side wall of the working chamber after the bolt mounting device has been removed from the carrier 26 by rotating the bolt mounting device 32 horizontally about the vertical shaft 110 together with the rails 106 and 108 so as not to disturb the operation for removing the control rod drive mechanism 7.

Figure 22:
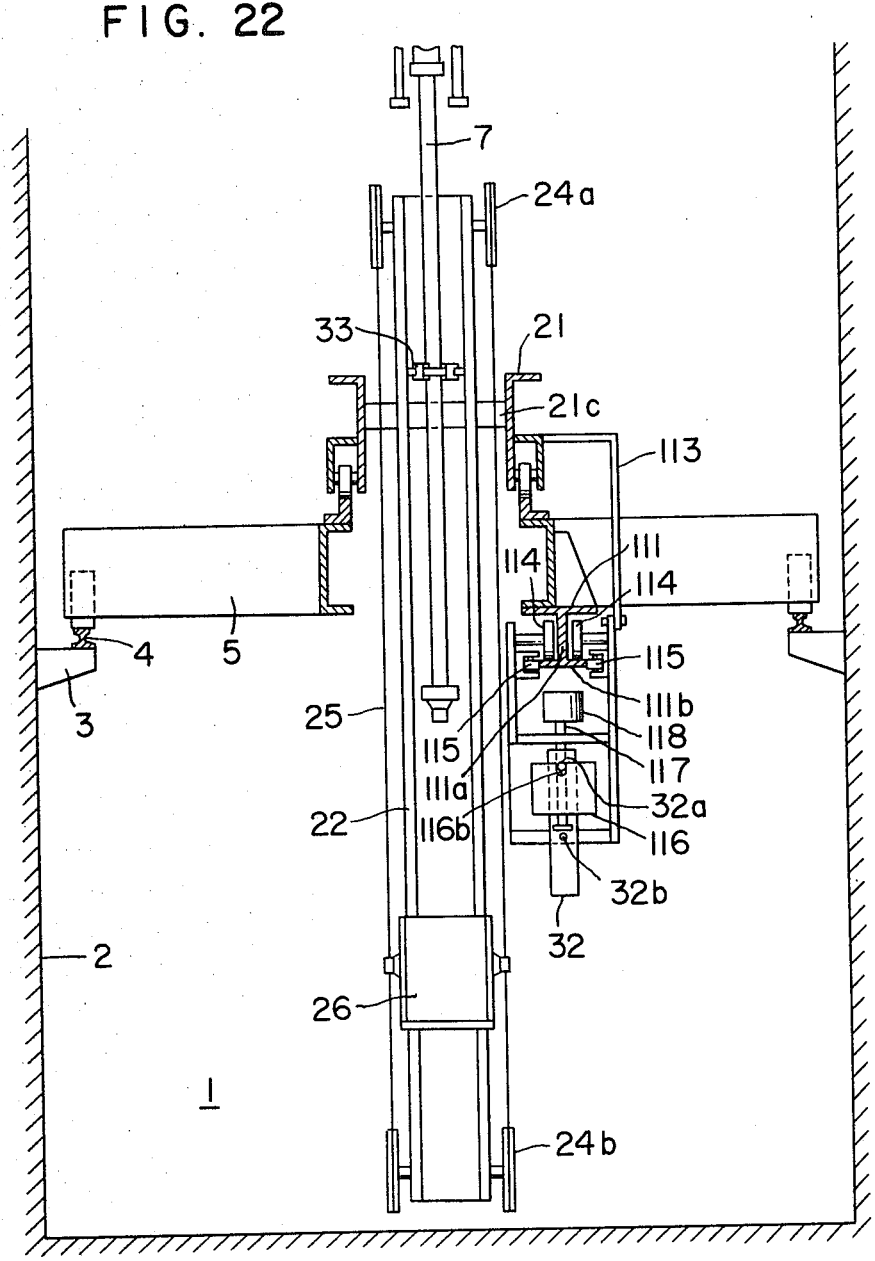
FIG. 22 and FIG. 23 show side and front views of still further embodiment of the apparatus according to this invention.
Figure 23:
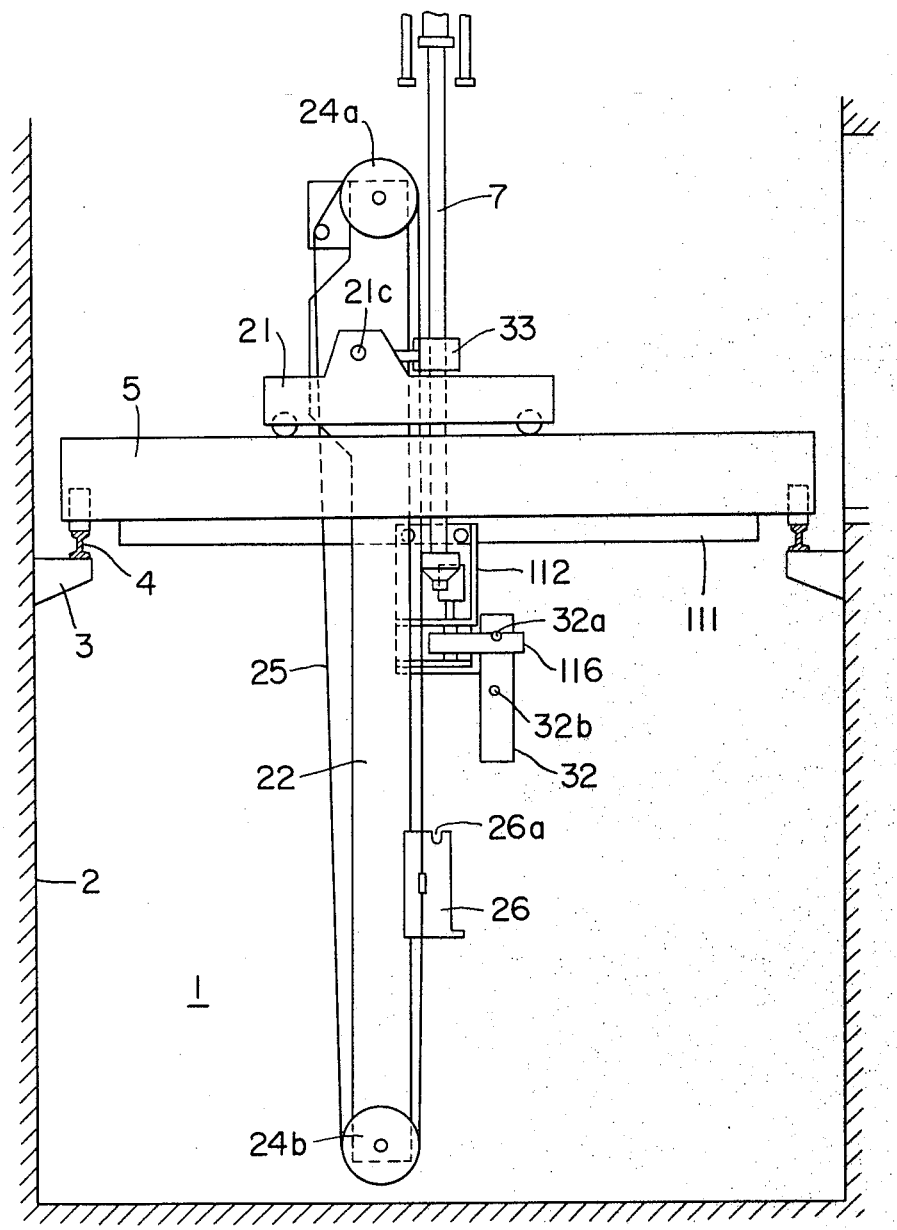
Figure 24:
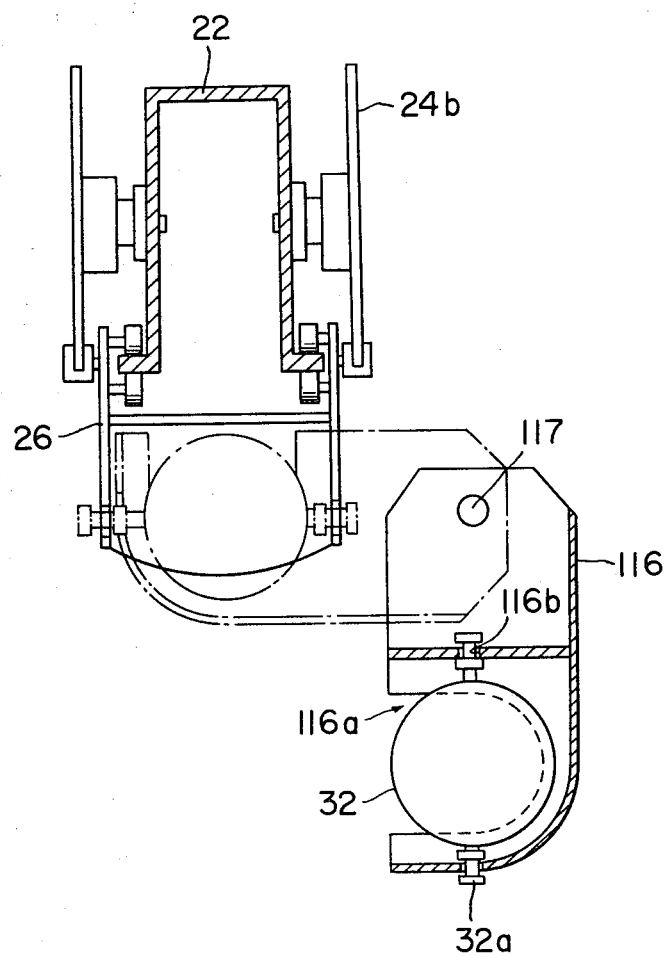
FIG. 24 shows a sectional view of the bolt mounting device utilized in the apparatus shown in FIG. 22.

FIGS. 22 through 24 show still another (third) embodiment of the control rod drive mechanism exchanging apparatus according to this invention, in which the bolt mounting device 32 is mounted on the carrier 26 by a carriage provided with a rotatable frame 116. According to this embodiment, a rail 111 having I-shape cross section is located at the lower surface of the platform 5 to extent in the direction of traveling of the traveling carriage 21, and a carriage 112 for conveying the bolt mounting device 32 is suspended by an arm member 113 attached to one side of the traveling carriage 21. Within the upper portion of the carriage 112, there are housed traveling wheels 114 disposed on both sides of the vertical member 111a of the rail 111 to roll on the lower member 111b of the rail 111, and guide wheels 115 abutting against the side surfaces of the lower member 111b. One end of the frame 116 is pivotably attached to the vertical shaft 117 of the carriage 112 so that the frame 116 is swingable by about 90° drive means 118, and the frame 116 having the other end provided with a U-shape engaging portion 116a adapted to engage the bolt mounting device 32 as shown in FIG. 24. The U-shape engaging portion 116a is formed so that the opened end thereof will face the beam when it is in the vertical state when the frame 116 is rotated by about 90° to the position shown by dot and dash lines in FIG. 24, and on both side walls of the opening of the U-shape portion 116a there are provided recesses 116b adapted to engage the pins 32a projected from both side walls of the bolt mounting device 32.

In a case where the removal of the control rod drive mechanism 7 is necessary, the carrier 26 is firstly lowered to the position having no operational relationship with the bolt mounting device 32 and the frame 116 is then rotated about 90° so as to move the bolt mounting device 32 engaging the U-shape engaging portion 116a to the position above the carrier 26. Under this condition, the carrier 26 is raised to hold the bolt mounting device 32 by causing the engaging pins 32b provided for the bolt mounting device 32 to engage the notches 26a provided for both side ends of the carrier 26. The carrier 26 is then slightly raised till the engaging pins 32a of the bolt mounting device 32 disengaged from the recesses 116b of the frame 116.

After the pins 32a of the bolt mounting device 32 have been disengaged, the frame 116 is rotated by about 90° to the original position. Then, the chains 25 are driven to raise the carrier 26 on which the bolt mounting device 32 is supported and to urge the device against the control rod drive mechanism 7 located at the bottom of the reactor pressure vessel. Thus, the bolts connecting the control rod drive mechanism 7 to the pressure vessel are drawn off by the operation of the bolt mounting device 32. After the bolts have been drawn off, the control rod drive mechanism 7 is lowered by lowering the carrier 26 and is held by the holding arm 33 when the control rod drive mechanism 7 is lowered by a predetermined length. The frame 116 is then rotated towards the beam 22 and the carrier 26 is further slightly lowered to cause the recesses 116b of the frame 116 to engage the pins 32a of the bolt mounting device 32 thereby disengaging the engaging pins 32b from the carrier 26, whereby the bolt mounting device 32 is completely held by the frame 116, which is then rotated to the original position shown in FIG. 24 by solid lines. The movement of the control rod drive mechanism 7 to the inspection chamber, after the device 32 has been moved from the passage of movement of the carrier, is carried out in substantially the same manner as that described in connection with the first embodiment of this invention.

Figure 25:
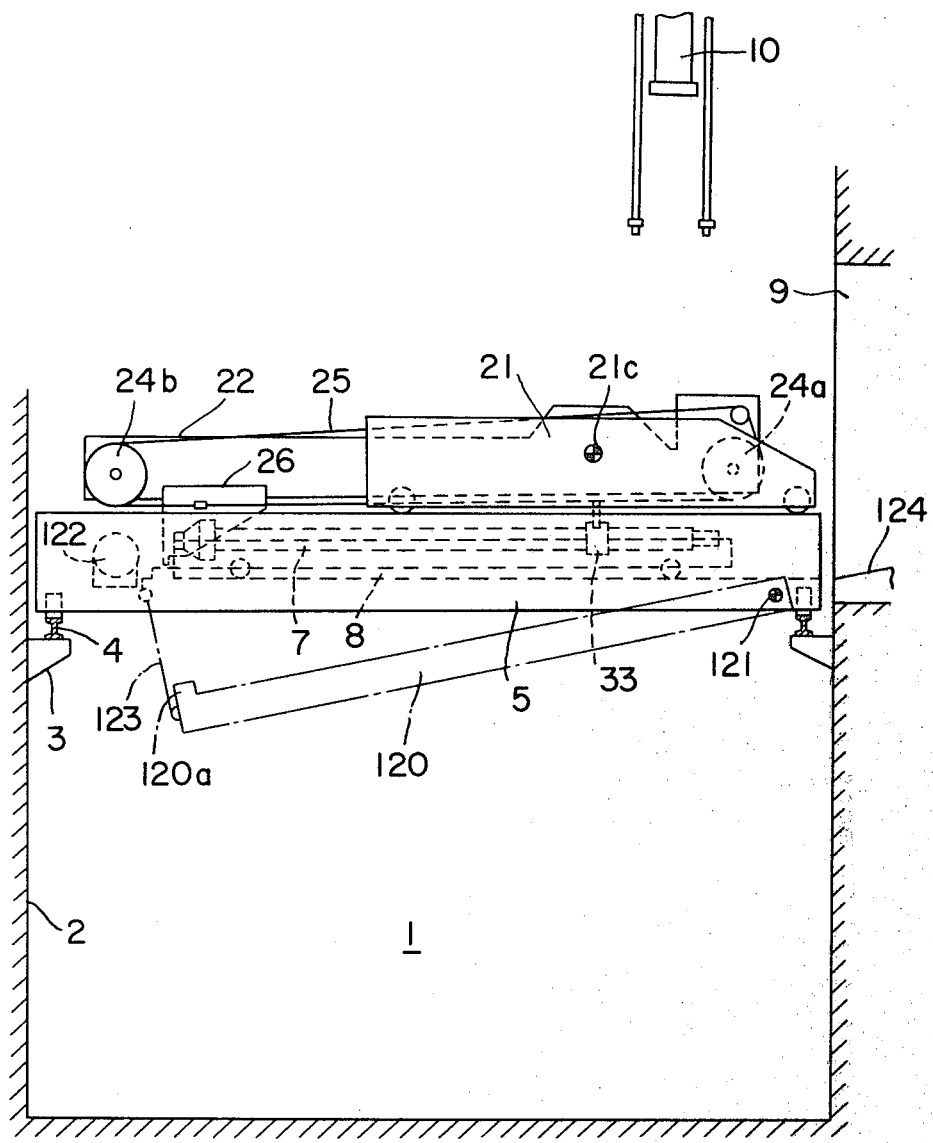

FIG. 25 shows still further (fourth) embodiment of the control rod drive mechanism exchanging apparatus according to this invention, in which one ends of movable rails 120 adapted to support the carriage 8 for conveying the control rod drive mechanism 7, are pivotably supported by pins 121 at one end of the central hollow portion 5a of the platform 5, and the other ends of the rails 120 are held by a wire-rope 123 driven by a winch 122. A longitudinal hollow space is defined between the rails 120 so that the beam 22 can tilt without contacting the movable rails 120, whereby the bilateral wheels of the carriage 8 can be freely move on the respective rails 120. Further, the rails 120 are provided with a stopping member 120a at one end for stopping the over movement of the carriage 8, and rails 124 are located at the entrance passage 9 so as to align with the rails 120 to smoothly move the carriage 8 when the platform 5 is rotated.

In this fourth embodiment, to remove the control rod drive mechanism 7 from the working chamber 1 the control rod drive mechanism 7 drawn out from the housing 10 of the reactor core is firstly moved to the horizontal position by and together with the beam 22. Then, the rails 120 are also tilted about the pin 121 by driving the winch 122 through the wire-rope 123 to the position where the inclination of the rails 120 is equal to that of the rails 124 provided for the entrance passage 9, as shown by dot and dash lines in FIG. 25. In this state, the conveying carriage 8 travels on the rails 124 and 120 and enters from the passage 9 into the position where it abuts against the stopping member 120a. The wire-rope 123 is then wound by the winch 122 to return the rails 120 to the horizontal position together with the conveying carriage 8. Thereafter, the control rod drive mechanism 7 is transferred along the carriage 8 from the beam 22, and the rails 120 are then tilted again to the firstly tilted position by driving the winch 122. The control rod mechanism 7 on the carriage 8 is then conveyed out of the working chamber through the passage 9.

According to this fourth embodiment shown in FIG. 25, the control rod drive mechanism conveying carriage 8 freely moves on the rails 120 with ends pivotably supported by the pin 121 attached to the platform 5 and the control rod drive mechanism 7 is easily transferred on the carriage 8 by tilting the rails 120 to the horizontal position from the beam 22 without using jack means which was often used in prior arts.

Further, although the fourth embodiment according to this invention is provided with movable rails 120 for conveying carriage 8 disposed on the platform 5, these rails are not always required to be movable, but in this case, it is necessary to secure the rails so that the inclination thereof is the same as that of the rails 124. In such arrangement, the beam 22 will swing between the vertical position of the beam 22 at the time when the control rod drive mechanism 7 is fitted or removed and the horizontally inclined position thereof in parallel with the rails 124 for conveying the carriage 8. Thus, the conveying carriage can smoothly move into and out of the entrance passage 9 by aligning the inclination of the rails 120 in the working chamber 1 with that of the rails 124.

Although, in all of the foregoing embodiments, it was described that the control rod drive mechanism 7 is transferred to and from the beam 22 to move the carriage for mounting the mechanism 7 into the relatively narrow working chamber 1 below the reactor pressure vessel, this transfer can be made to the other places as disclosed hereinbelow in conjunction with FIGS. 26 through 29.

FIGS. 26 through 29 show such case wherein the control rod drive mechanism 7 is transferred from the first working chamber 1, wherein rails 126 are laid on the floor of the passage 9 at the same level as the rails 20 for the traveling carriage 21 disposed on the platform 5. These rails 126 extend into a second outer working chamber 125 located adjacent the passage 9, and the rails 20 are laid so as to be connected in line with the rails 126 by rotating the platform 5 to a predetermined position as occasion demands.

On the floor of the working chamber 125 there are laid rails 127 extending from the lower portion of the rails 126 towards an inspection chamber, not shown, for carrying out periodical inspection of the control rod drive mechanism 7 and on the rails 127 there is mounted a conveying carriage 128 on which jacks 129 and 130 are disposed so that the carriage 128 can travel below the traveling carriage 21 on which the control rod drive mechanism 7 is being supported.

Figure 26:
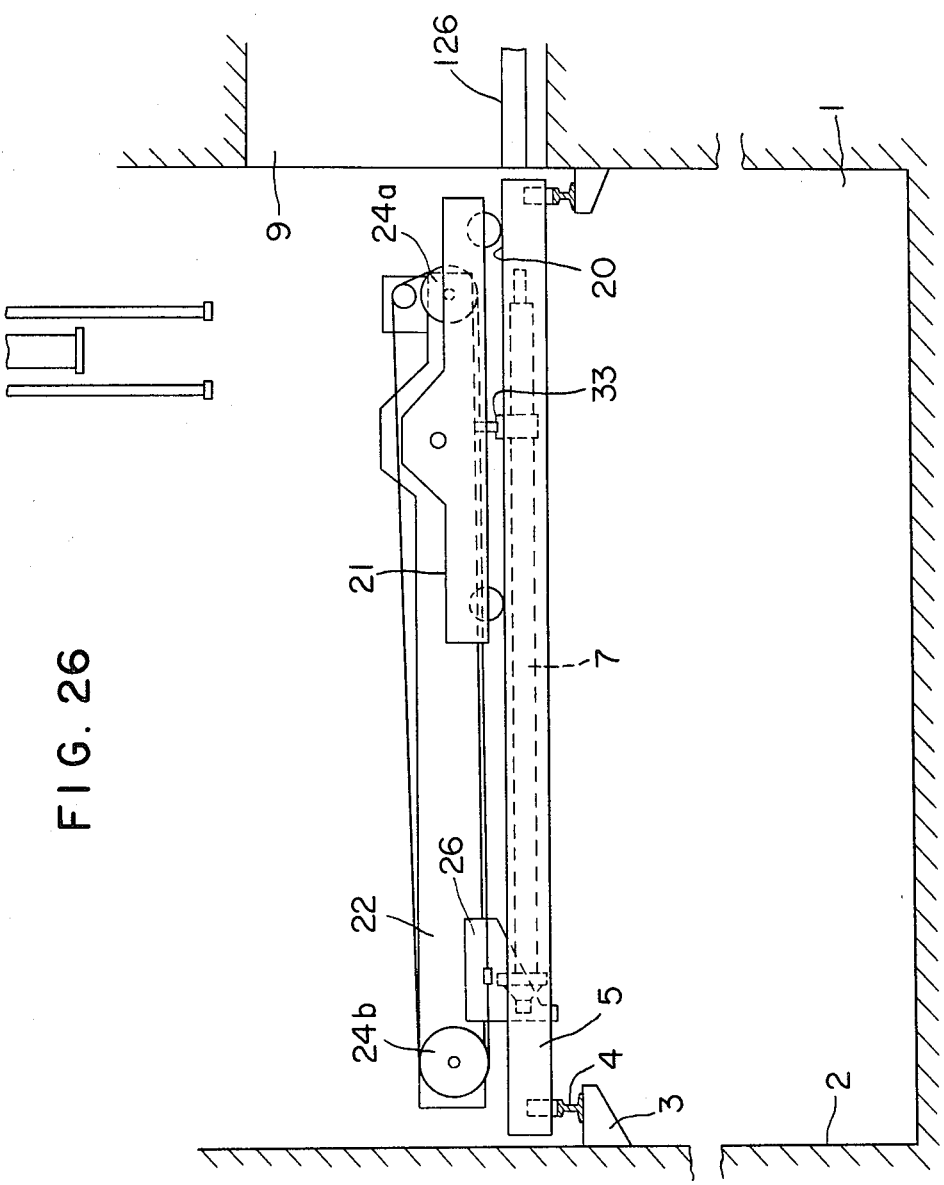
Figure 27:
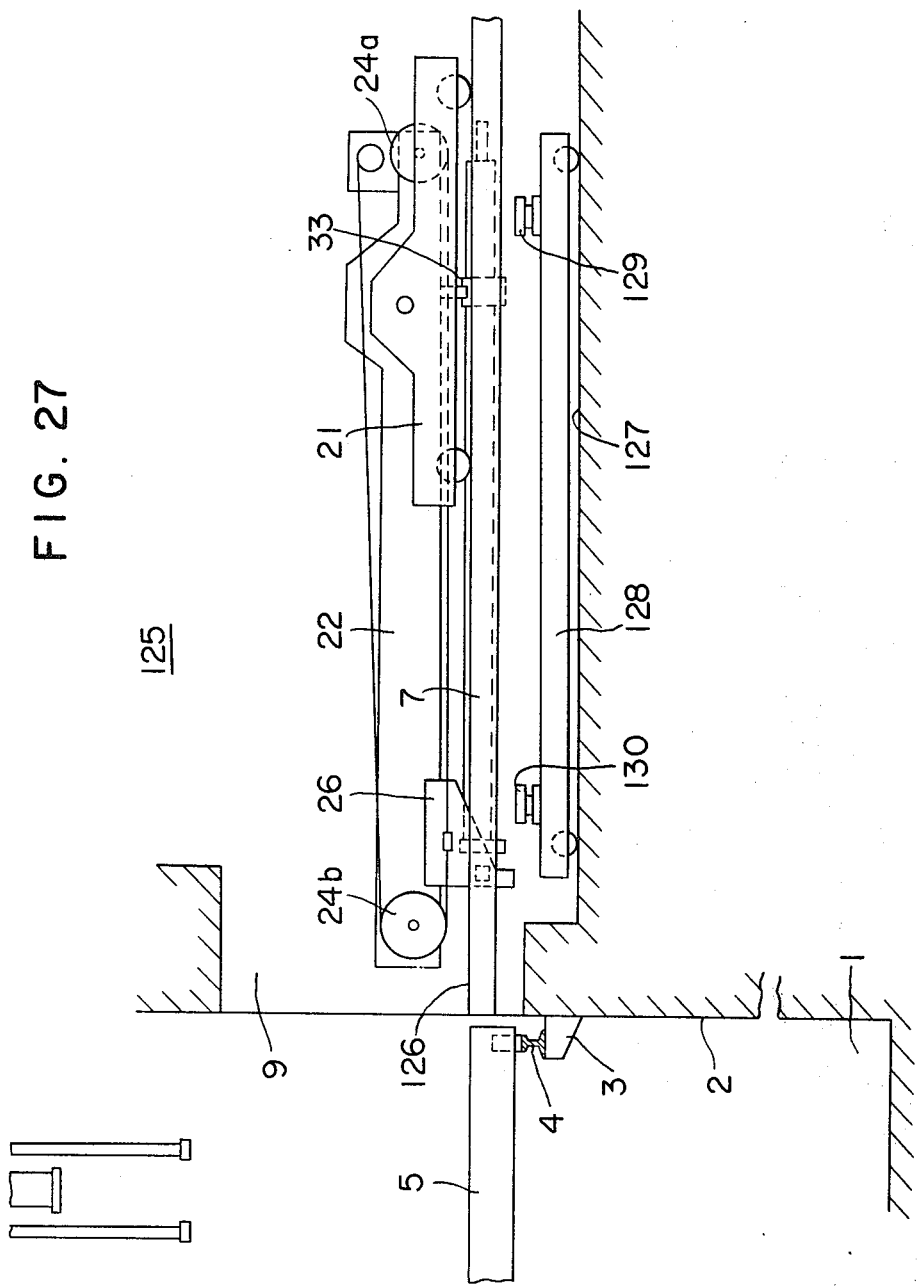
Figure 28:
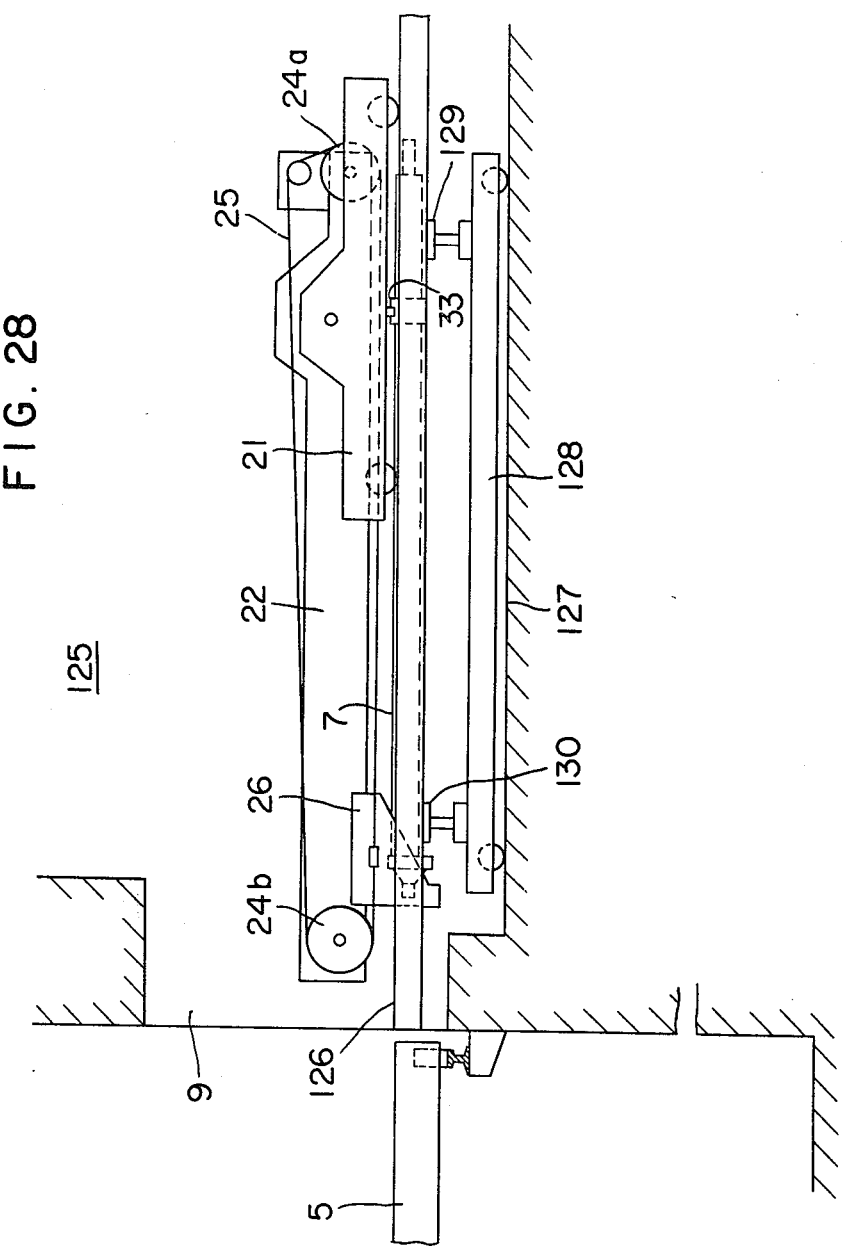
Figure 29:
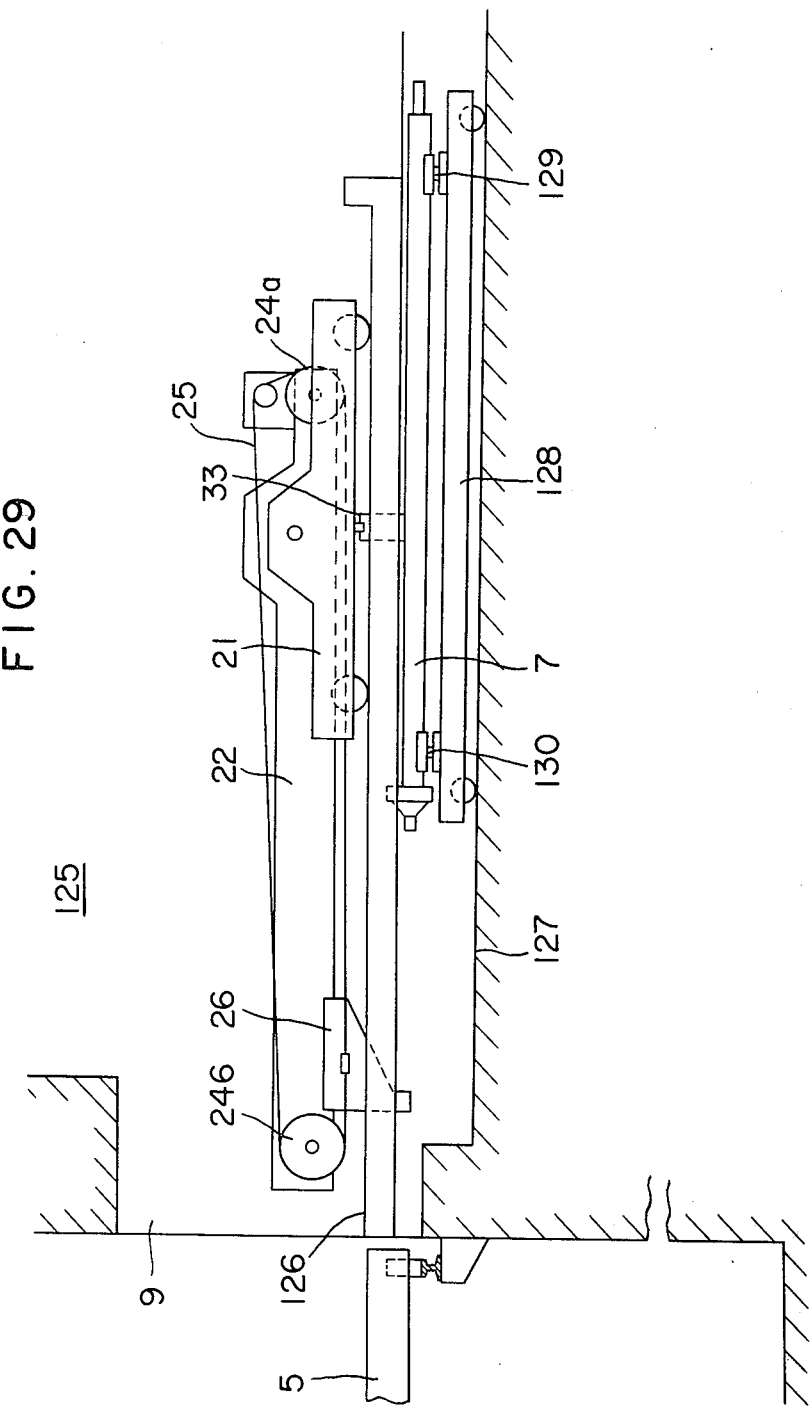

According to the arrangement described above, the control rod drive mechanism 7 drawn out from the reactor pressure vessel is firstly tilted to the horizontal position by rocking the beam 22 and the platform 5 is then rotated so as to connect the rails 20 on the platform 5 to the rails 126 in the passage 9 as shown in FIG. 26. Thereafter, the traveling carriage 21 with the control rod drive mechanism 7 mounted thereon is moved on the rails 20 and 126 to convey it out of the first working chamber 1. The carriage 21 conveyed from the working chamber 1 stops at the position where the control rod drive mechanism 7 on the carriage 21 is positioned directly above the conveying carriage 128 as shown in FIG. 27. The jacks 129 and 130 are raised to support the control rod drive mechanism 7. The holding arm 33 which is firmly holding this mechanism 7 is then loosened and the chains 25 are slightly driven, thus transferring the control rod drive mechanism 7 from the carriage 21 onto the carriage 128 as shown in FIG. 28. Then, the jacks 129 and 130 are retracted and the conveying carriage 128 is moved along the rails 127 into the inspection chamber as shown in FIG. 29.

It will of course be understood that the control rod drive mechanism 7 can be attached to the reactor pressure vessel by the reverse operations opposite to that described in connection with FIGS. 26 through 29.

Further, in a case where the level of the floor of the inspection chamber or a passageway connected thereto is the same as that of the second working chamber 125, the carriage 128 can travel directly into the inspection chamber or the passageway, but in a certain case, these levels of the floors are different from each other according to the structure of a nuclear reactor. Such case will be described hereinbelow in conjunction with FIGS. 30 and 31.

Figure 30:
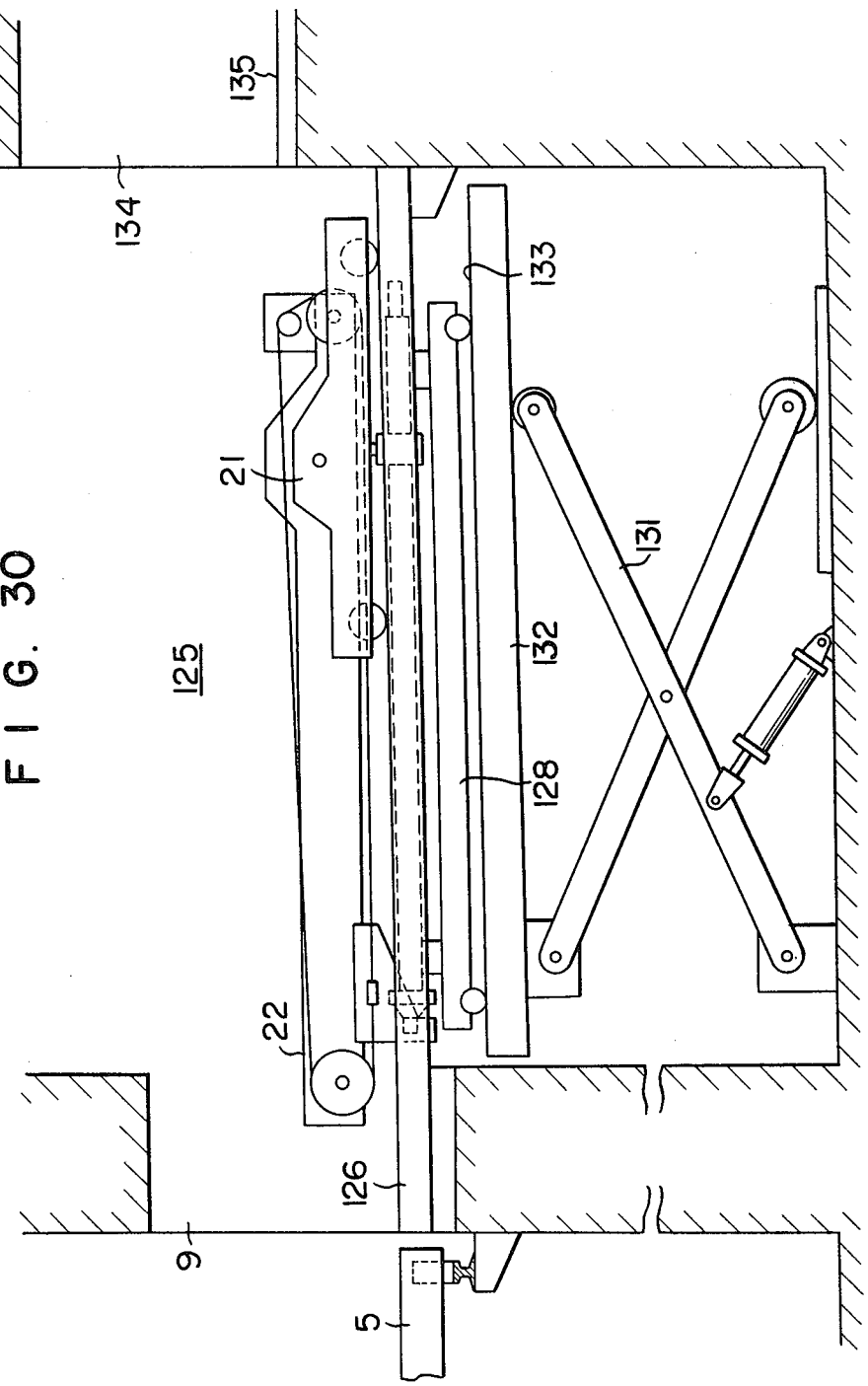
Figure 31:
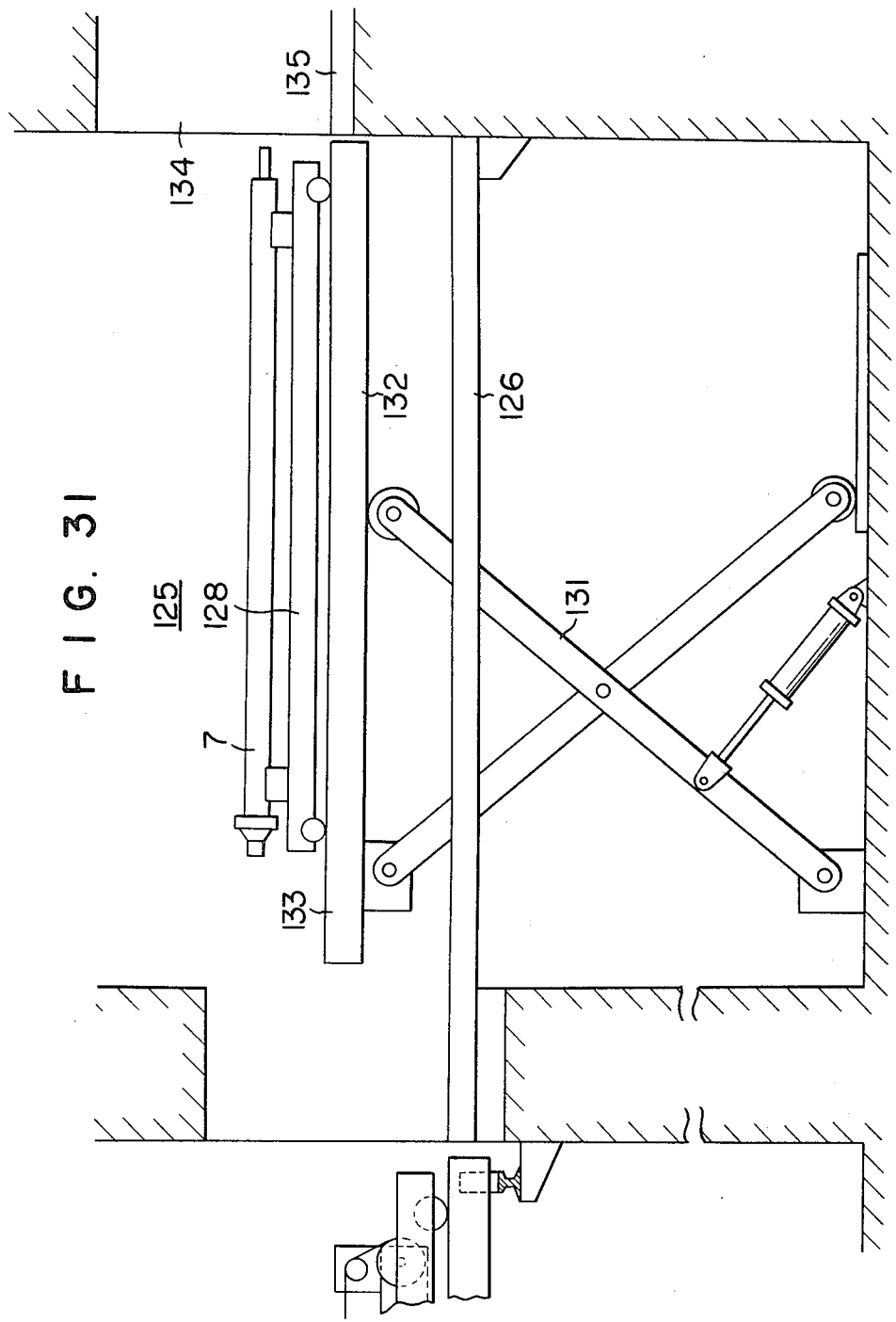

Regarding FIGS. 30 and 31, an elevating mechanism for supporting and elevating a table 132 is disposed on the floor of the working chamber 125 and rails 133 on which the conveying carriage 128 travels are laid on the elevating table 132 so that the rails 133 will be connected to rails 135 extending into the inspection chamber through the passageway 134 when the elevating table is raised by the elevating mechanism 131. When the traveling carriage 21 moves into the working chamber 125, the elevating mechanism 131 operates to raise the elevating table 132 together with the conveying carriage 128, whereby the control rod drive mechanism 7 is transferred from the traveling carriage 21 to the conveying carriage 128. After the control rod drive mechanism 7 has been transferred, the elevating table 132 is once lowered and the traveling carriage 21 is moved back into the working chamber 1. Then the elevating table is again raised to the position where the rails 133 are connected in line with the rails 135 laid in the passage way 134 to outwardly move the conveying carriage 128 together with the control rod drive mechanism 7 as shown in FIG. 31.

Figure 32:
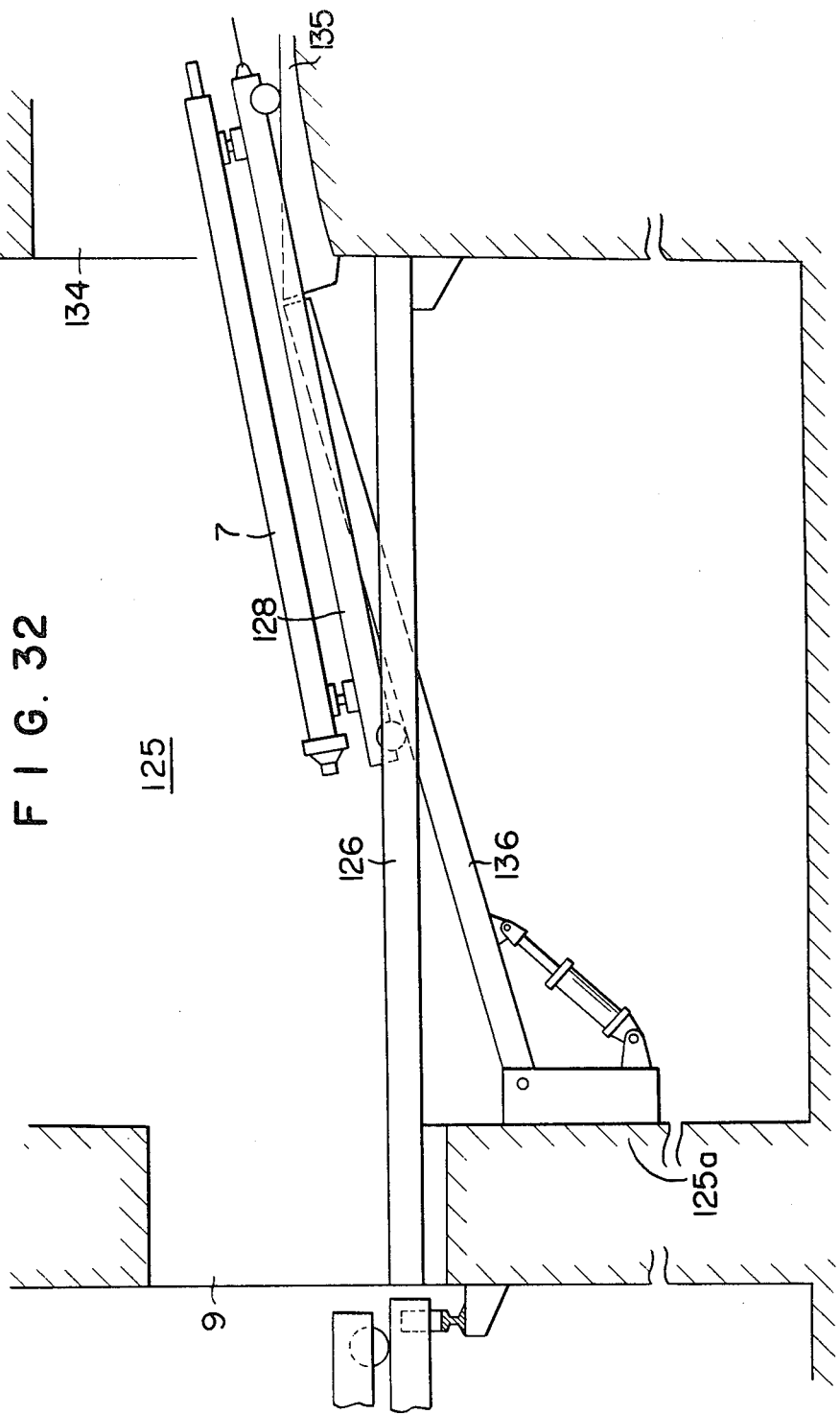

FIG. 32 shows another example for moving the conveying carriage 128 into the working chamber 125, in which the rails 127 are laid on a track 136 pivotably secured by suitable means to the side wall 125a of the working chamber 125 opposing the wall provided with the passage 134. In this example, the rails 127 are connected in line with the rails 135 by upwardly tilting the track 135 to outwardly move the carriage 128 together with the control rod drive mechanism 7.

Figure 33:
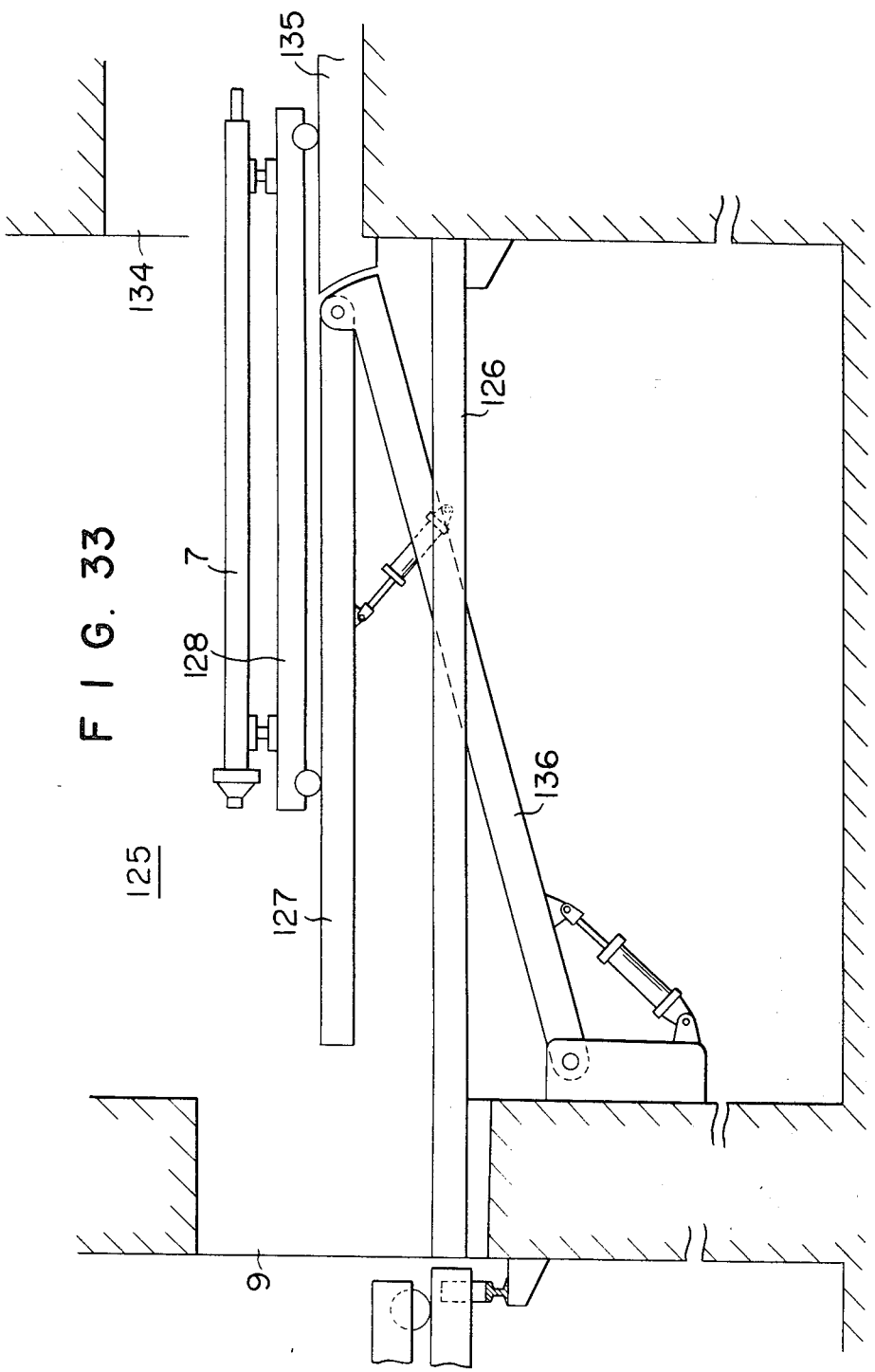

FIG. 33 shows a case where one ends of the rails 127 are pivotably secured to the front end of the track 136, and in this case, the rails 127 are upwardly rotated about the front end of the track 136 to a horizontal position parallel with the rails 135, thus smoothly and horizontally moving the carriage 128 together with the control rod drive mechanism 7.

Figure 34:
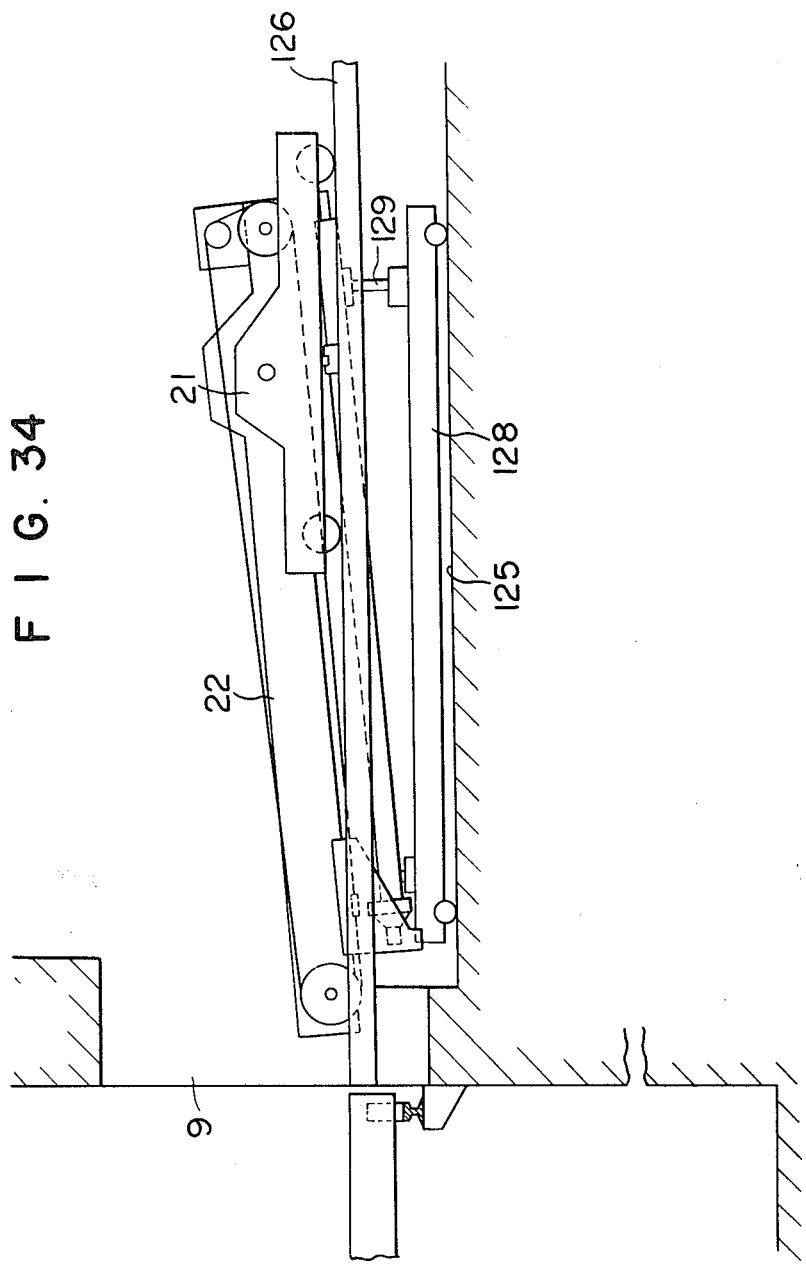

Although in the foregoing examples conveying carriage 128 provided with two jacks 128 and 129 was shown, it is possible, as shown in FIG. 34, to support the upper portion of the control rod drive mechanism 7 by the jack 129 by utilizing the characteristic feature of the swingable beam 22, that is, the lower portion of the control rod drive mechanism 7 is moved on the carriage 128 by utilizing this swingable feature of the beam 22.

Furthermore, with the examples provided with the second working chamber 125, the operators are not required to work in the first working chamber 1 where they may be exposed to radiations and almost all jobs, such as loading of the control rod drive mechanism 7 on the conveying carriage, can be carried out in the second outer working chamber 125, thus substantially eliminating the danger of exposing the workers to radiations. Moreover, since apparatus and devices, such as a traveling carriage and a beam, for use in the exchange of the control rod drive mechanism could be accommodated in the second working chamber 125 when they are not used, these devices are also hardly exposed to radiations, and the inspection and the maintenance thereof can be readily and safely carried out in this second working chamber.

In an ordinary boiling water reactor, the distance from the lower end of the stud bolt 11 to the floor of the working chamber 1 is predetermined to a minimum which is slightly longer than the entire length of the control rod drive mechanism in view of the cost of constructing a nuclear reactor plant. For this reason, in order to completely draw out the control rod drive mechanism in the vertical direction, it is necessary to remove the bolt mounting device 32 as described hereinbefore. Therefore, it is required to move the carriage for conveying the bolt mounting device 32 each time when this device 32 is removed and in order to properly maintain the positional relationship between the bolt mounting device 32 and the beam 22, it is necessary to perform troublesome adjustment. However, this troublesome adjustment can eliminated by always connecting the bolt mounting device 32 conveying carriage 54 to the beam 22 when the beam 22 assumes the vertical position. This arrangement will be described with reference to FIGS. 35 through 37.

Figure 35:
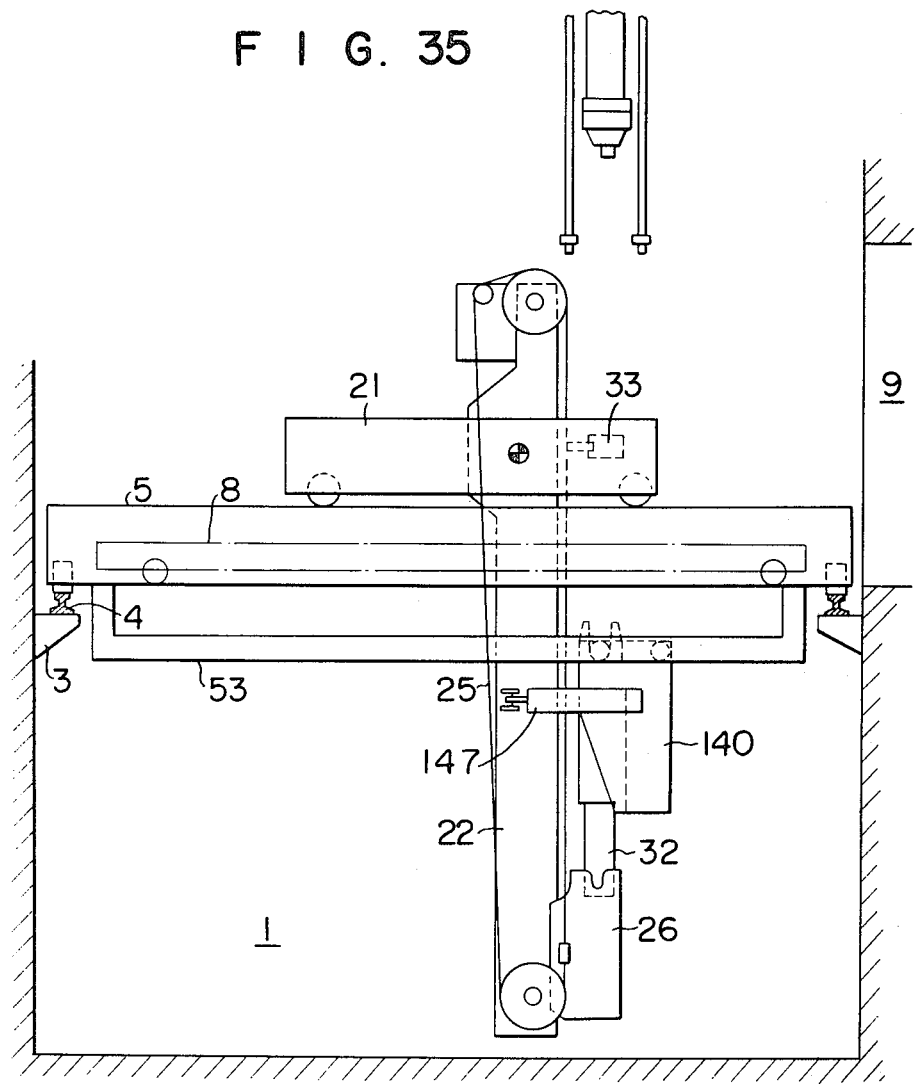
Figure 36:
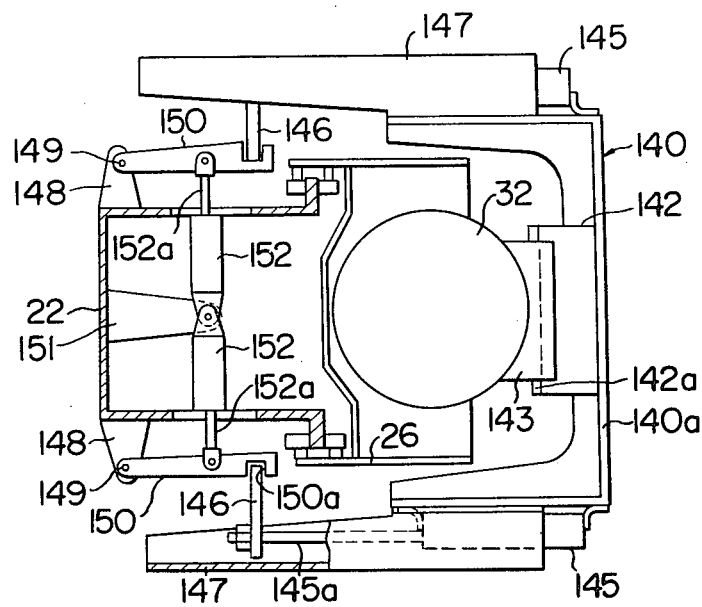
Figure 37:
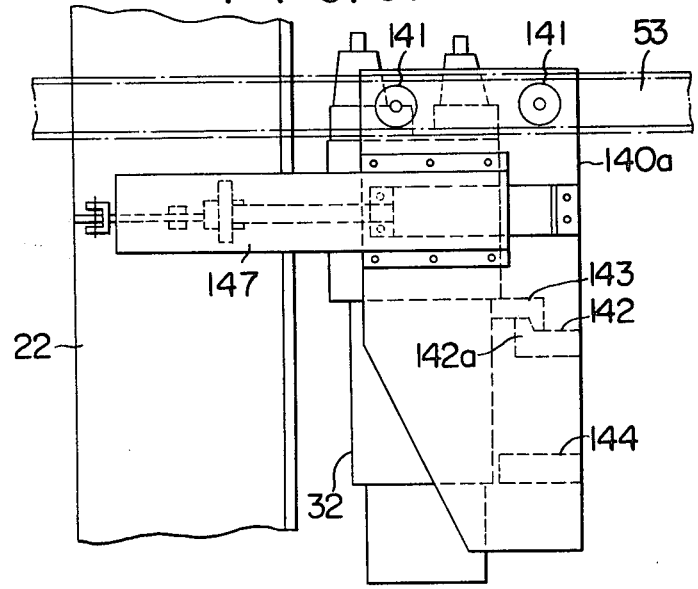

In FIGS. 35 through 37, a carriage 140 for conveying the bolt mounting device 32 is provided with wheels 141 near the upper portion of the frame 140a of the carriage 140 to be movable along rails 53 disposed below the platform 5. As shown in FIG. 36, the frame 140a has a U-shaped cross-section and a seat member 142 having projections 142a is attached to the inside surface of the frame 140a opposing the vertical beam 22. The seat member 142 engages a latch member 143 provided on the side surface of the bolt mounting device 32 so as to hold the bolt mounting device 32 by the frame 140a. A supporting plate 144 contacting the side surface of the bolt mounting device 32 is attached to the frame 140a at a portion beneath the seat member 142 thereby maintaining the bolt mounting device 32 in upright state (FIG. 37). Air cylinder-piston assemblies 145 are attached to both side surfaces of the frame 140a and coupling members 146 are secured to the piston rods 145a of the assemblies 145, respectively. These coupling members 146 project to oppose each other. The frame 140a is further provided with U-shaped elongated covers 147 which cover the air cylinder-piston assemblies 145 and each of these covers 147 also covers the base of the coupling members 146, thereby permitting the coupling members to reciprocate in the direction parallel with the piston rod 145a but not permitting its rotation thereabout.

Pedestals 148 are attached to both sides of the beam 22. One ends of connecting links 150 are connected by pins 149 to the pedestals 148, respectively, and recesses 150a are formed on the outer sides of the other ends of the link members 150 to receive coupling members. A pedestal 151 is attached to the inside of the beam 22 to pivotably support the bases of two air cylinder-piston assemblies 152. The front ends of the piston rods 152a of the air cylinder-piston assemblies 152 are connected to the corresponding link members 150. According to this arrangement, upon operation of respective air cylinder-piston assemblies 152, the recesses 150a of connection link members 150 engage or disengage the front ends of the coupling member 146.

The size of each air cylinder-piston assembly 145 is predetermined so that the bolt mounting device 32 carried by the carriage 140 will be positioned on the elevating passage of the carrier 26 when the piston rod 145a is mostly contracted, i.e., when the frame 140a most closely approaches the beam 22 and so that the carrier 26 supporting the control rod drive mechanism 7 can be freely elevated when the piston rod 145a is mostly protruded, i.e., when the frame 140a is most remote from the beam 22.

When it is desired to remove the control rod drive mechanism 7, the conveying carriage 140 is connected to the beam 22 by engaging the member 146 with the link members 150. Under these conditions, the bolt mounting device 32 approaches most closely the beam 22 by contracting the air cylinder-piston assemblies 145 and the bolt mounting device 32 is moved to a position below the desired control rod drive mechanism 7 to be removed in combination of the rotatary movement of the platform 5 with the linear movement of the traveling carriage 21 described hereinbefore. After the position of the bolt mounting device 32 has been adjusted, the carrier 26 is raised to support and transfer the bolt mounting device 32 carried on the carriage 140 and the bolts which connect the control rod drive mechanism 7 to the housing 10 are removed by the operation of the bolt mounting device 32. After the bolts have been removed, when the carrier 26 is lowered to draw out the control rod drive mechanism 7, the holding arm 33 holds the mechanism 7. As the carrier 26 is lowered further latch member 143 of the bolt mounting device 32 engages the seal member 142 of the conveying carriage 140, whereby the bolt mounting device 32 is transferred onto the carriage 140.

Upon completion of the operations described above, when the air cylinder-piston assemblies 150 operate to move the bolt mounting device 32 in a direction remote from the beam 22, due to the connection of the beam 22 with the front end of the piston rods 145a through the engagement of the coupling members 146 with the link members 150, the carriage 140 is moved away from the beam 22.

The carrier 26 is again raised to receive the control rod drive mechanism 7 to draw out it, and the platform 5 and the traveling carriage 21 are then moved to positions suitable for rotating the beam 22 from the vertical state to the horizontal state.

When the beam 22 has been moved to its tiltable position, the air cylinder-piston assemblies 152 are operated to disengage the link members 150 from the coupling members 146, thus enabling the beam 22 to rotate to the horizontal position. Thereafter, the control rod drive mechanism 7 is transferred onto the conveying carriage 8 which is conveyed into the inspection chamber in a manner described hereinbefore. In this example, since the bolt mounting device conveying carriage is connected to the beam 22 and moved together with the traveling carriage 21, the positional adjustment of the bolt mounting device conveying carriage with respect to the beam 22 can be eliminated each time when the control rod drive mechanism is exchanged, thereby reducing the working time and job of the operators.

In the aforementioned embodiments, although the control rod drive mechanism 7 is once held by the holding arm 33 during the lowering of the control rod drive mechanism 7, it may be possible to temporarily hold the control rod drive mechanism by the bolt mounting device conveying carriage.

This example will be described in detail hereunder in conjunction with FIGS. 28 through 40, in which a carriage 160 for conveying the bolt mounting device 32 is movably mounted on the rails 20 laid on the platform 5 for the traveling carriage 21. The conveying carriage 160 is provided on its both sides with connection fingers 163 to be rotatable about pins 162 which are operated by means of air cylinder-piston assemblies 161. The conveying carriage 160 and the traveling carriage 21 are connected with each other by the engagement of the fingers 163 and pins 164 projected from the both sides of the traveling carriage 21.

Figure 39:
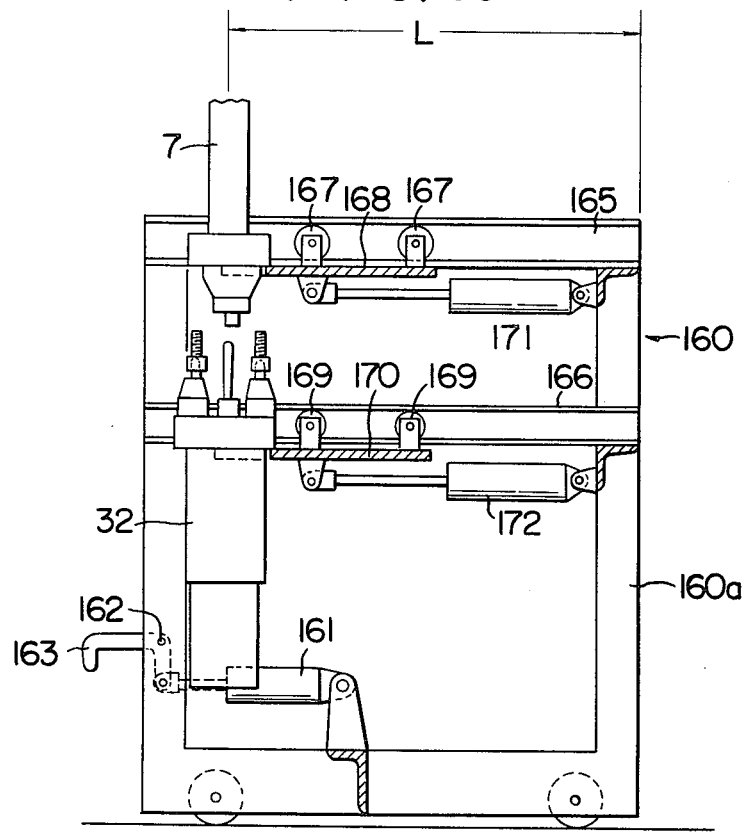
Figure 40:
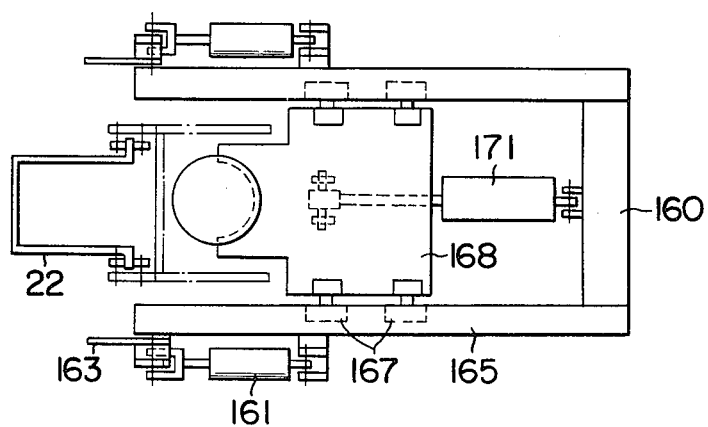

The bolt mounting device conveying carriage 160 is further provided with a frame 160a (FIG. 39). Rails 165 and 166 with a predetermined spacing therebetween are laid on the upper and lower surfaces of the frame 160a. A first supporting member 168 is carried by the upper rails 165 through wheels 167 and the first supporting member 168 can be moved along the rails 165 so as to travel between a position where the control rod drive mechanism 7 is supported and a position not to disturb the elevation of the carrier 26. A second supporting member 170 is carried by the lower rails 166 through wheels 169 so as to travel between a position where the bolt mounting device 32 is supported and a position not to disturb the elevation of the carrier 26. These supporting members 168 and 170 are actuated by air cylinder-piston assemblies 171 and 172, respectively. In this arrangement, when the bolts which connect the control rod drive mechanism 7 to the housing 10 are to be loosened, the second supporting member is firstly advanced to move the bolt mounting device 32 to a position in the passage of the carrier 26. Then, the carrier 26 is raised to transfer the bolt mounting device 32 to its operating position in the same manner as described before. When the control rod drive mechanism 7 is drawn out by a predetermined length, the first supporting member 168 is advanced to support the control rod drive mechanism 7. Thereafter, the bolt mounting device 32 is transferred onto the second support member 170 by lowering the carrier 26. The bolt mounting device 32 is then returned to the retracted position. The carrier 26 is again raised to support the control rod drive mechanism 7, and the first supporting member 168 is retracted to the position not to disturb the movement of the carrier 26. Thereafter, the control rod drive mechanism will be completely drawn out and conveyed into the inspection chamber in the same manner as described hereinbefore. Further, it should be noted that when the beam 22 is tilted to its horizontal position, the connection finger 163 is rotated counter-clockwisely as viewed in FIG. 37 by the air cylinder-piston assembly 161 to disengage the finger 163 from the pin 164 so as to move the conveying carriage 160 to the position not to disturb the tilting movement of the beam 22.

According to the example described just above, since the control rod drive mechanism 7 is not held and temporarily suspended by the holding arm 33, but supported by the supporting member, the control rod drive mechanism 7 is frimly supported. Furthermore, in this example, since the bolt mounting device conveying carriage travels along the rails for the traveling carriage, the bolt mounting device can be operated to a relatively high position so that exchange of bolts by the spanners can be readily carried out through the passage 9 provided through the side wall of the working chamber 1.

Figure 41:
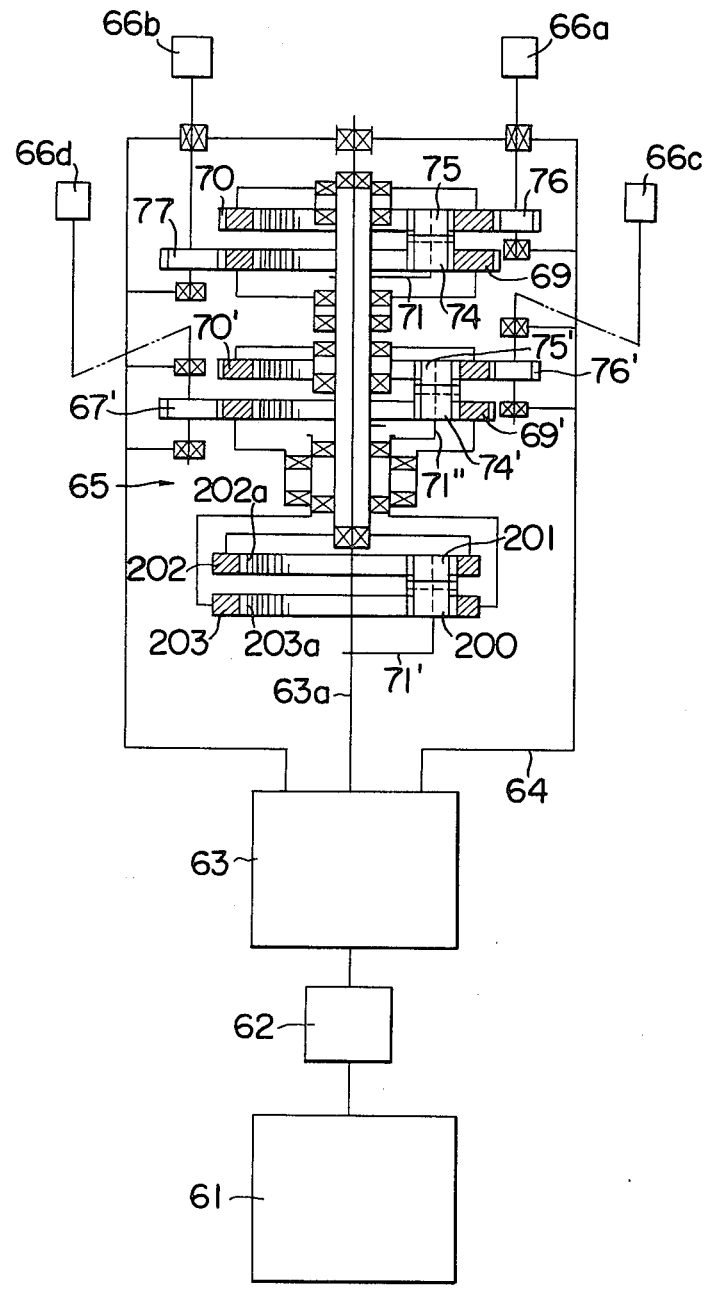
FIG. 41 through FIG. 44 show still further examples of the bolt mounting device.

FIG. 41 shows another example of a multi-shaft bolt clamping device of the bolt mounting device of this invention, in which the bolt mounting device 32 is provided with four spanners 66a, 66b, 66c and 66d and a differential gearing 65 for driving these spanners. In this example, the output shaft 63a is provided with an arm 71' to which pinions 200 and 201 such as shown in FIG. 7 are mounted, and these pinions are adapted to mesh with internal gears 202a, and 203a so as to rotate discs 202 and 203 for supporting the internal gears 202 and 203, respectively. Thus, the arm 71' is rotated integral with the supporting disc 202 and an arm 71'' is also rotated integral with the supporting disc 203 thereby rotating pinions 74' and 75', respectively. According to this gearing arrangement, the spanners 66a through 66d clamp all bolts firmly with uniform torque when the differential gearing 65 is driven.

Figure 42:
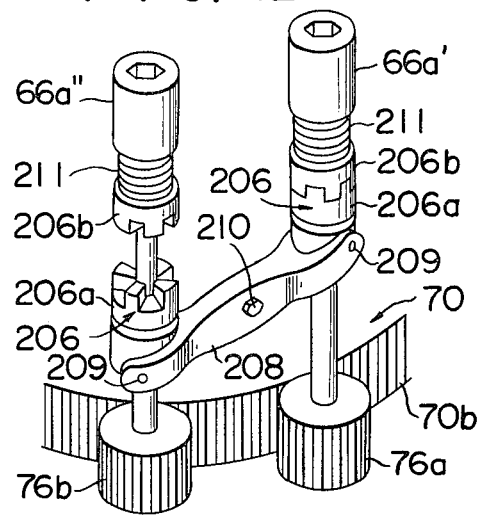
Figure 43:
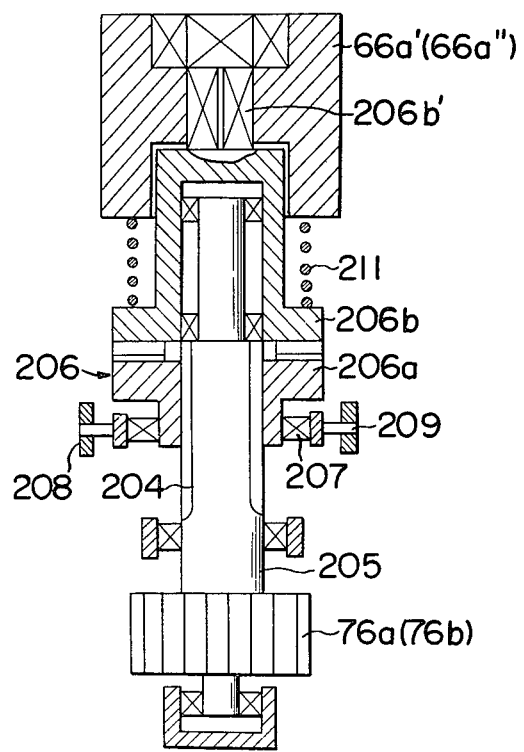

FIGS. 42 and 43 show another example wherein eight bolts are clamped all at once. In FIG. 43, a pair of gears 76a and 76b are meshed with the external gear 70 and rotary shafts 205 for the gears 76a and 75b are provided with splines 204, respectively, to which movable engaging portions 206a of clutches 206 are fitted so that the clutches 206 can slide vertically and rotate integrally with the rotary shafts 205. The movable engaging portions 206a are connected with each other through a swingable rod 208 having fork-shape ends. The rod 209 is connected to each engaging portion through bearings 207 and pins 209 of the rod 208. The rod is swingable about a pin 210. Stationary engaging portions 206b adapted to engage the movable engaging portions 206a of the clutches 206 are loosely mounted on the rotary shafts 205.

Spanners 66a' and 66a'' are fixedly mounted on the square shafts 206b' of the stationary engaging portions 206b through springs 211, respectively.

Figure 6:
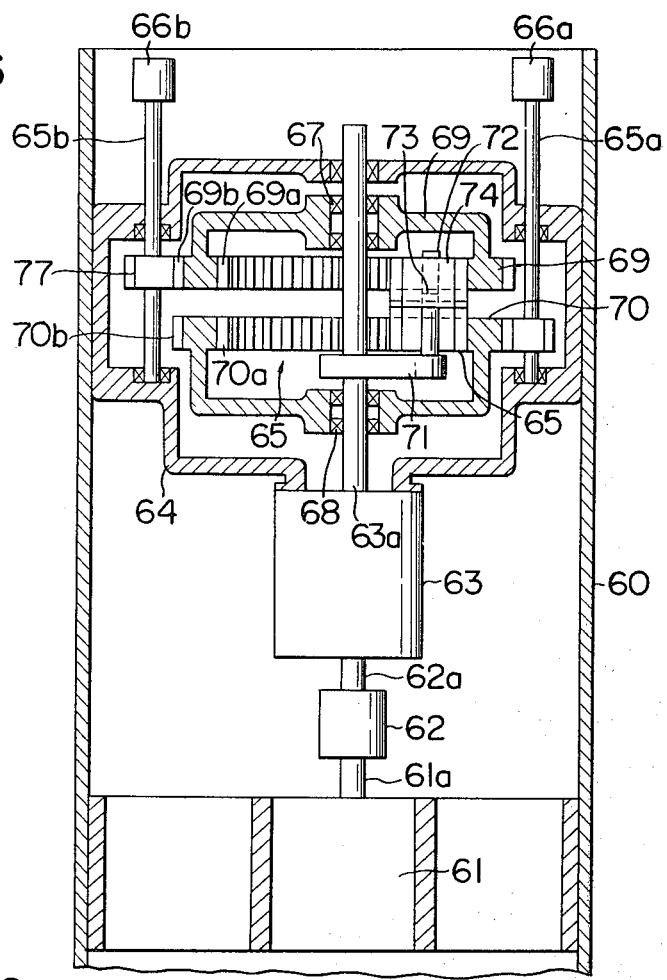
FIG. 6 shows a cross-sectional view of a multi-shaft automatic bolt clamping assembly of a bolt mounting device.

Accordingly, when the examples shown in FIGS. 6 and 42 are combined, it should be understood that four bolts are clamped all at once by mere design change of the spanner 66a to the spanners 66a' and 66a'', and when examples shown in FIGS. 41 and 42 are combined, it should also be understood that eight bolts can be clamped all at once.

Figure 44:
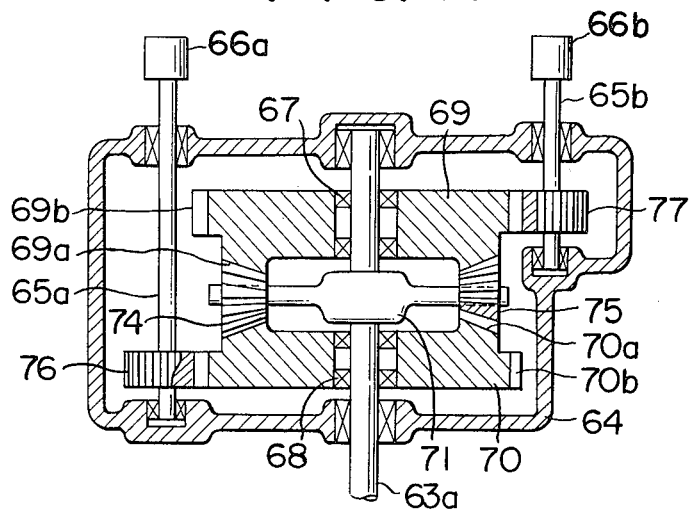

FIG. 44 shows another example of FIG. 6, in which a differential gearing 65 comprising bevel gears is utilized in the example shown in FIG. 44 in place of differential gearing 65 comprising spur gears shown in FIG. 6.

One example of the multi-shaft bolt clamping device of this invention including a bolt loosening device will be described hereunder with reference to FIGS. 45 and 46.

A drive disc 212 provided with a notch 212a is mounted on the output shaft 63a of the reduction gear 63, and the arm 71 is also loosely mounted thereon close to the drive shaft 212. To this arm 71 are embedded bases of the pins 72 and 73 on which the pinions 74 and 75 are mounted, respectively, and in addition to the engagement of these pinions 74 and 75, the pinion 74 meshes with the internal gear 69a and the pinion 75 meshes with internal gear 70a, respectively. A pin shaft 213 is loosely fitted to a portion of the arm 71. A swingable lock rod 214 and a pair of lock pawls 215a and 215b are firmly mounted on the pin shaft 213 as shown in FIG. 44, and a spring 216 is attached between one end of the lock rod 214 and the stepped portion of the arm 71 to cause the lock pawls 215a and 215b to engage the bottom lands of the gear teeth of the internal gears 69 and 70, respectively, due to the action of the spring 216. The other end 214a of the lock rod 214 extends into and engages with the notch 212a of the disc 212. The arm 71 is further provided with a projection 217 at a suitable position on the passage of movement of the swingable lock rod 214. According to this arrangement, when the drive disc 212 rotates clockwisely to push the projection 217, the arm 71 is rotated about the shaft 63a. Conversely, when the drive disc 212 rotates counter-clockwisely to push the end 214a of the rod 214, the rod 214 is rotated clockwisely about the pin 213 against the force of the spring 216 thereby disengaging the lock pawls 215a and 215b from the internal gears 69a and 70a. Then, the end 214a of the lock rod 214 pushes and rotates the projection 217, thus rotating the arm 71 about the output shaft 63a in the direction opposite to the direction described before. Further, the pin shaft 213 is held by an arm piece 218 loosely fitted on the output shaft 63a.

Now, when the two bolts which connect the control rod mechanism 7 to the housing 10 are to be loosened, the spanners 66a and 66b are engaged with the corresponding bolts. Under these conditions, when the electric motor 61 rotates, the differential gearing 65 is driven by the rotation of the output shaft 63a through the torque limit member 62 and the reduction gear 63. In other words, when the output shaft 63a is clockwisely rotated, the drive disc 212 pushes the projection 217 thereby rotating the arm 71 about the shaft 63a. Then, the lock pawls 215a and 215b firmly engage the bottom lands of the gear teeth of the internal gears 69a and 70a, respectively, so that the internal gears 69a and 70a are rotated by the pinions 74 and 75. At this time, even when the meshing of gears 69a, 70a with pinions 74 and 75 is not synchronous, the both gears can rotate synchronously by the locking action of the lock pawls 215a and 215b. However, when both lock pawls 215a and 215b are firstly completely engage with the internal gears 69a and 70a and the output shaft 63a is driven to clockwise rotate the arm 71 through the engagement with the projection 217, the internal gears 69a and 70a are clockwisely driven by the same torque with each other. At this time, when the internal gear 69a rotates to loosen the bolt engaged by the spanner 66a while clamping the other spanner 66b, the pinion 74 is rotated counter-clockwisely by the differencial gearing mechanism of the pinions 74 and 75 while stopping the other internal gear 70a and while the pinion 75 is rotating clockwisely, thus clockwisely rotating the internal gear 69a. However, when the arm 71 is slightly rotated clockwisely by the rotation of this pinion 75, the lock pawl 215b firmly engages the internal gear 70a, thereby imparting a strong driving force to the internal gear 70a. Thus, both internal gears 69a and 70a are rotated to loosen the corresponding bolts and then, the amounts of rotation of both gears are maintained to be equal, thus, in such case, loosening the bolts by the internal gears 69a and 70a through the spanners 66a and 65b.

In the example described directly above, the clamping of two bolts are carried out by the following manner.

When the disc 212 is rotated counter-clockwisely by the counter-clockwise rotation of the output shaft 63a, the wall of the notch 212a formed on the disc 212 pushes the swingable lock rod 214 and the rod 214 is then rotated clockwisely about the pin shaft 213 against the force of the spring 216. The rotation of this rod 214 disengages the lock pawls 215a and 215b from the internal gears 69a and 70a, respectively. When the rod 214 collides against the projection 217, the arm 71 provided with the pinions 74 and 75 is rotated, thus clamping all bolts at the same time.

Figure 47:
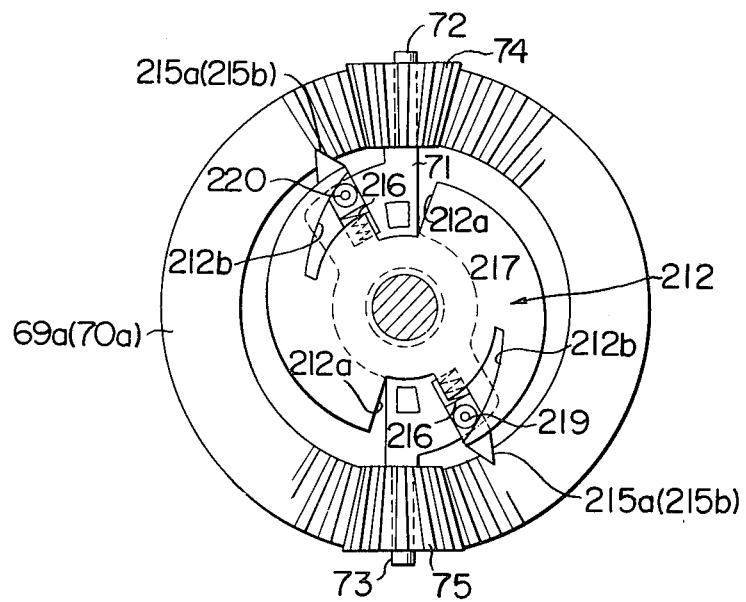
FIG. 47 is a plan view showing a modification of FIG. 45.

Finally, FIG. 47 shows another example of the automatic multi-shaft bolt clamping device of this invention including a bolt loosening device and this example is a modification of the example provided with the bevel gear-type differential gearing shown in FIG. 44.

In this example, a drive disc 212 provided with a pair of notches 212a is firmly mounted on the output shaft 63a and a pair of cam members 212b is provided on the outer periphery of the disc 212. An arm 71 provided with pinions 74 and 75 is loosely mounted on the output shaft 63a and projections 217 are formed on the intermediate portions of the projections of the arm 71 so as to engage the notches 212a, respectively. Furthermore, radial guide grooves 219 are formed on the arms near the projections 217 and lock pawls 215a and 215b are slidably fitted into the guide grooves 219 so that the lock pawls will engage the bottom lands of the gear teeth of the internal gears 69a and 70a, respectively, by the forces of springs 216. The lock pawls 215a and 215b include rollers 220 so as to abut against the cam members, respectively.

According to this arrangement, when the output shaft 63a is clockwisely rotated, the lock pawls 215a and 215b are disengaged from the guide grooves 219 by the operation of the cam members 212b integrally formed with the disc 212 through the rollers 220, thus enabling the pinions 74 and 75 to be freely rotatable.

On the other hand, when the output shaft 63a is counterclockwisely rotated, the cam portions 212b lock and temporarily fix the lock pawls 215a and 215b to the internal gears 69a and 70a through the rollers 220 by forces of the springs 216. As above described the loosening and clamping of the bolts can be carried out by the rotation of the output shaft 63a.

Consequently, as is clarly understood from the foregoing descriptions, according to this invention, since there is provided apparatus for exchanging control rod drive mechanisms comprising a beam 22 tiltably mounted on the traveling carriage disposed below the reactor pressure vessel, a carrier 26 movable along the edge of the beam, and a conveying mechanism for mounting the bolt mounting device on the carrier, it became possible to exchange the control rod drive mechanism purely mechanically and to eliminate the jobs of the workers in the working chamber likely to be exposed to relatively high radiations, thus assuring the safeness of the workers and moreover, largely eliminating the works of the workers.

We claim:

1. In apparatus for exchanging a control rod drive mechanism of a nuclear reactor of the type comprising a horizontal platform supported to be rotatable in a working chamber disposed below a reactor pressure vessel and a traveling carriage traveling on a rail assembly laid on said platform, the improvement which comprises a beam attached to said traveling carriage to be swingable between the vertical and horizontal portions and provided with a carrier for vertically moving said control rod drive mechanism, bolt mounting means for loosening and clamping bolts which are used to connect said control rod drive mechanism to a housing in the reactor pressure vessel; holding means secured to said beam for carrying one end of said control rod drive mechanism when said control rod mechanism is separated from said bolt mounting means and holding said control rod drive mechanism when said beam is swung to said horizontal position, said holding means being received in a position where said holding means is not interferred with said carrier when said carrier passes near said holding means; means for conveying said bolt mounting means in and out of the passage of movement of said carrier so that said control rod drive mechanism can easily be withdrawn vertically without being interferred with said bolt mounting means; and means for receiving said control rod drive mechanism when said beam has been moved to said horizontal position and for conveying said control rod drive mechanism into an inspection chamber for inspecting said control rod drive mechanism through a passage provided for the peripheral wall of said working chamber.

2. The apparatus according to claim 1 wherein a rail assembly for conveying said bolt mounting mean is disposed to said platform in parallel with the direction of traveling of said traveling carriage and a further carriage for conveying said bolt mounting device is movably mounted on said rail assembly.

3. The apparatus according to claim 2 wherein said rail assembly is disposed on both sides of the passage of movement of said carrier.

4. The apparatus according to claim 2 wherein said rail assembly is disposed on one side of the passage of movement of said carrier.

5. The apparatus according to claim 4 wherein said bolt mounting means is moved out of the passage of movement of said carrier by horizontally rotating said rail assembly.

6. The apparatus according to claim 2 wherein said bolt mounting means conveying carriage is rotatably provided with a frame, said frame having an engaging member at the front end adapted to engage said bolt mounting device so that when said frame is rotated, said bolt mounting device will be moved out of the passage of movement of said carrier.

7. The apparatus according to claim 6 wherein said bolt mounting means conveying carriage is connected to said traveling carriage disposed on said platform.

8. The apparatus according to claim 1 wherein said bolt mounting means is provided with wheels so that said bolt mounting means travels on a rail assembly disposed to said platform in parallel with the direction of traveling said traveling carriage.

9. The apparatus according to claim 8 wherein means for conveying said bolt mounting means is provided for said rail assembly.

10. The apparatus according to claim 1 wherein a rail assembly, on which said means for receiving and conveying said control rod drive mechanism travels, has an inclination substantially equal to that of a rail assembly laid on said passage provided for the peripheral wall of said working chamber.

11. The apparatus according to claim 1 wherein said rail assembly for guiding said control rod drive mechanism receiving and conveying means is constructed to be vertically rotatable about one end of said rail assembly.

12. The apparatus according to claim 1 wherein said working chamber located below the reactor pressure vessel is communicated with an outer working chamber through the passage provided for the peripheral wall of said first mentioned working chamber and said rail assembly for guiding said traveling carriage is connected to the rail assembly laid on said passage through the peripheral wall of said first mentioned working chamber so that said traveling carriage on which said beam is mounted will be moved from said first mentioned working chamber to said outer working chamber.

13. The apparatus according to claim 1 wherein said bolt mounting means receiving and conveying means is provided with a member adapted to be connected to said beam while it is held in vertical state and under the connected condition, said bolt mounting means can be moved into and out of the passage of movement of said carrier.

14. The apparatus according claim 1 wherein said means secured to said beam for holding said control rod drive mechanism comprises a holding arm provided with a pair of jaws adapted to firmly or loosely hold said control rod drive mechanism.

15. The apparatus according to claim 1 wherein said bolt mounting means includes a connecting member adapted to be connected to said traveling carriage or said beam when it is held in a vertical state, a first supporting member being movable towards or away from said beam when it is held in said vertical state and supporting said control rod drive mechanism, and a second supporting member being movable towards and away from said beam when it is held in said vertical state and supporting said bolt mounting means so as to convey it into and out of the passage of movement of said carrier.

16. The apparatus according to claim 1 wherein said bolt mounting means is provided with a differential gearing connected to the output shaft of an electric motor through torque limit means and a reduction gear, and wherein a multi-shaft automatic bolt clamping device having spanners on respective shafts is provided for a rotatary shaft of said differential gearing.

* * * * *